United States Patent
Kang et al.

(10) Patent No.: US 6,961,193 B2
(45) Date of Patent: Nov. 1, 2005

(54) DRIVING DEVICE

(75) Inventors: Byung Woo Kang, Seoul (KR); Oui Serg Kim, Seoul (KR)

(73) Assignee: Samsung Electro-Mechanics Co., LTD, Kyungki-do (KR)

( * ) Notice: Subject to any disclaimer, the term of this patent is extended or adjusted under 35 U.S.C. 154(b) by 0 days.

(21) Appl. No.: 10/614,894

(22) Filed: Jul. 9, 2003

(65) Prior Publication Data

US 2004/0174622 A1 Sep. 9, 2004

(30) Foreign Application Priority Data

Mar. 3, 2003 (KR) ................................ 10-2003-0013110

(51) Int. Cl.[7] ................................................. G02B 7/02
(52) U.S. Cl. ...................... 359/824; 359/814; 359/823
(58) Field of Search ................................ 359/814, 823, 359/824; 369/44.15, 44.16, 44.17; 310/232.02, 328, 369, 228

(56) References Cited

U.S. PATENT DOCUMENTS 5,101,278 A * 3/1992 Itsumi et al. ................ 348/357
6,215,605 B1    4/2001 Kuwana et al.

FOREIGN PATENT DOCUMENTS

JP            10-23771 A      1/1998

* cited by examiner

Primary Examiner—Hung Xuan Dang
Assistant Examiner—Joseph Martinez
(74) Attorney, Agent, or Firm—Lowe Hauptman & Berner, LLP

(57) ABSTRACT

A driving device, and more particularly, a lens driving device, for transporting a lens of an optical instrument via separate actuation of the lens itself includes guide elements connected perpendicularly with the lens for guiding reciprocating movement of the lens. The device further has driving elements arranged coplanar with the lens and fixed by a first end to a periphery of the lens for providing the lens with a transport force which is larger than an interactive force between the lens and the guide elements.

48 Claims, 25 Drawing Sheets

FIG. 11A
FIG. 11B
FIG. 11C
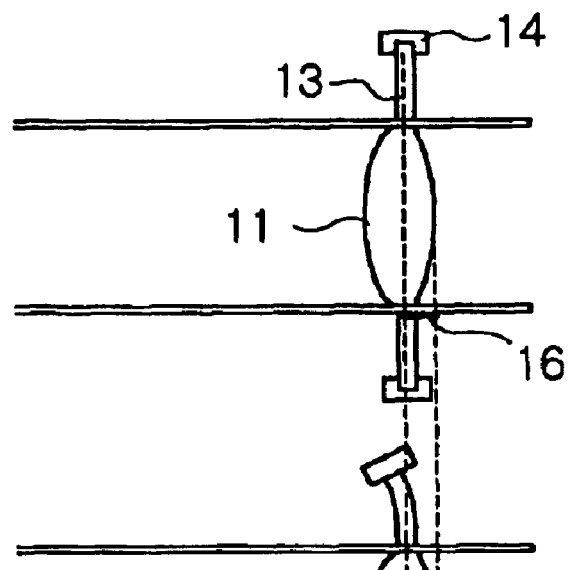
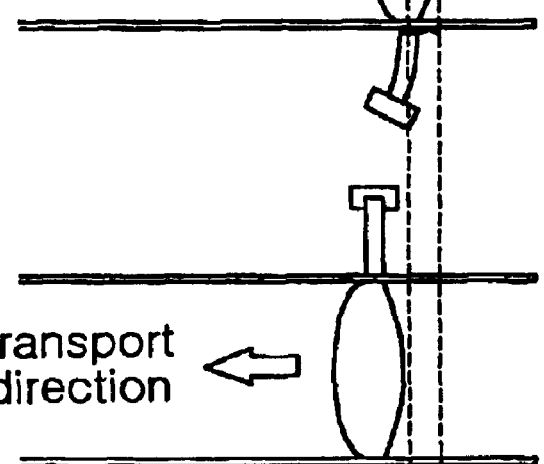
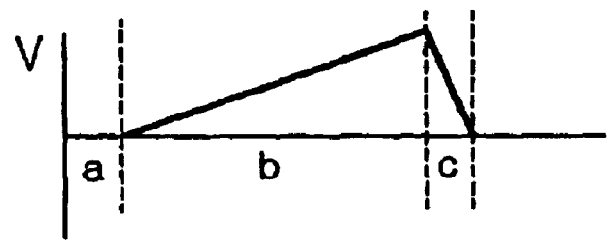

FIG. 12A
FIG. 12B
FIG. 12C
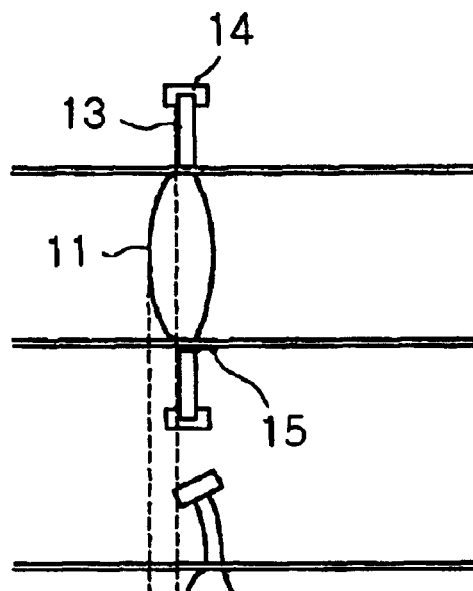
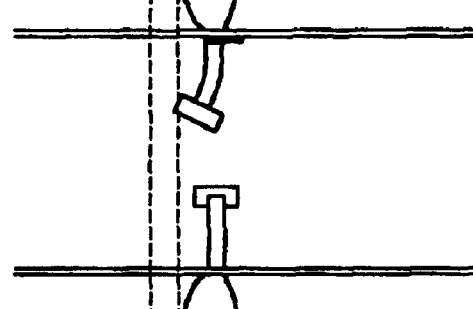
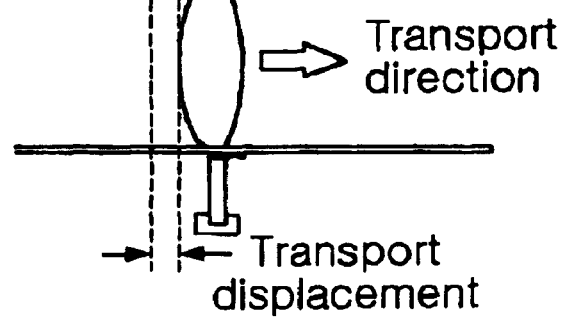
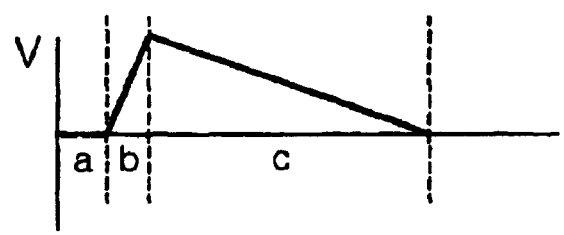

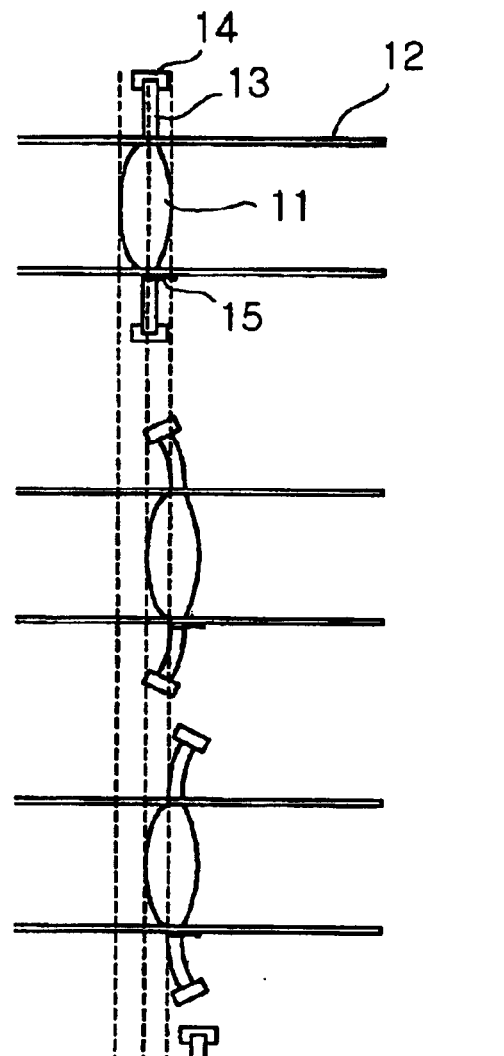

33

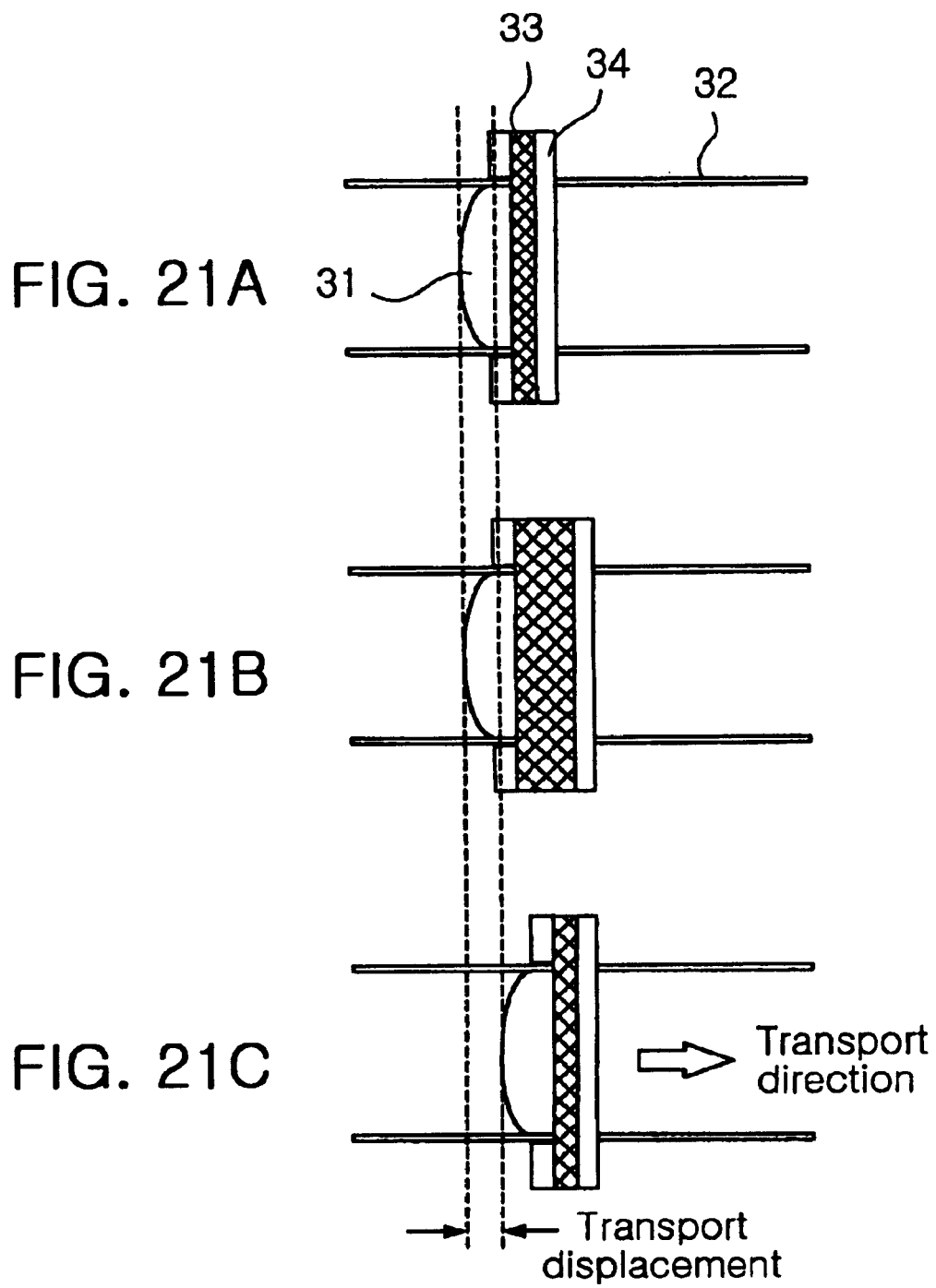
FIG. 21A
FIG. 21B
FIG. 21C
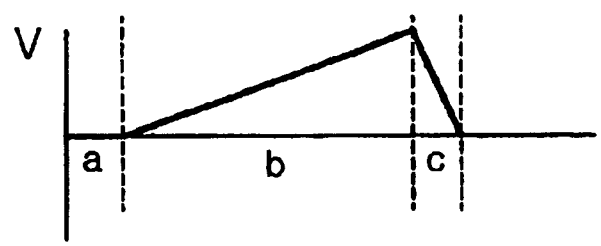

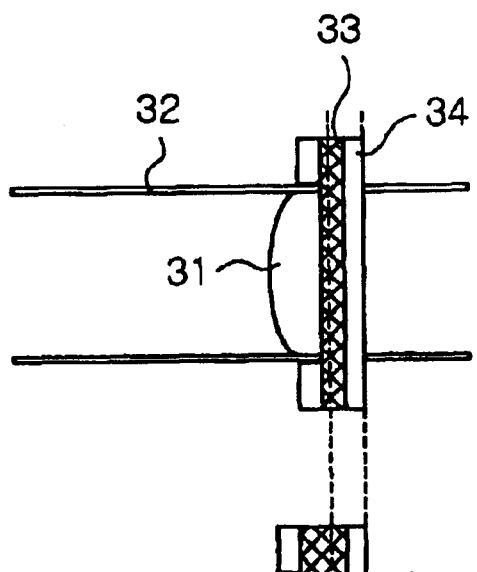
FIG. 22A
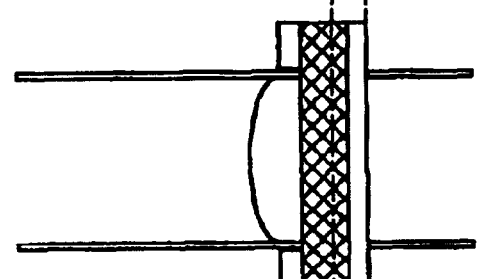
FIG. 22B
FIG. 22C
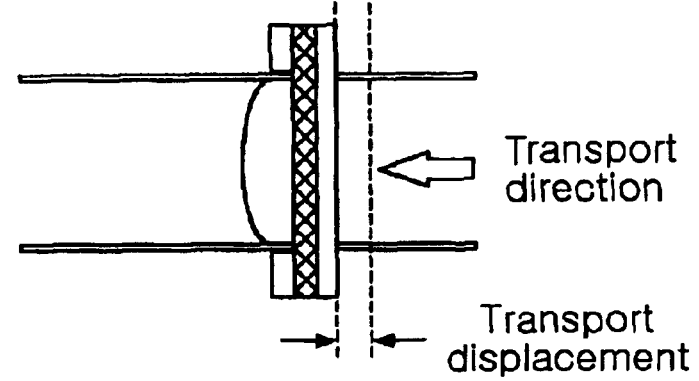
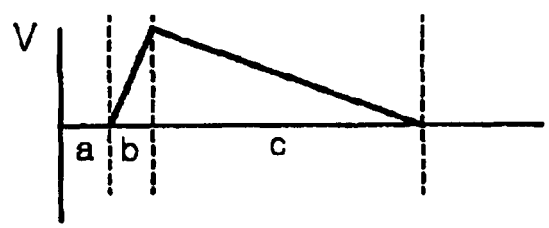

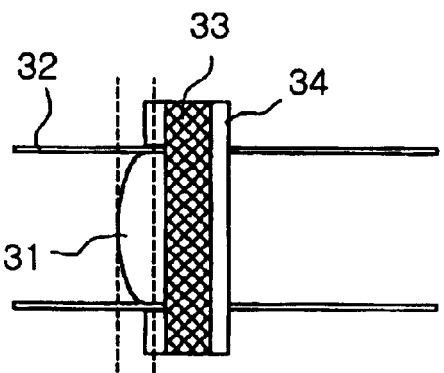
FIG. 23A
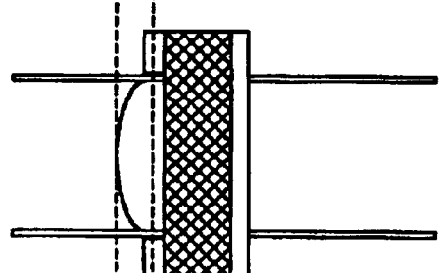
FIG. 23B
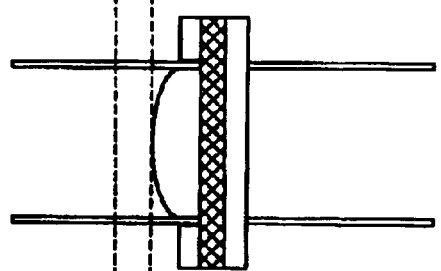
FIG. 23C
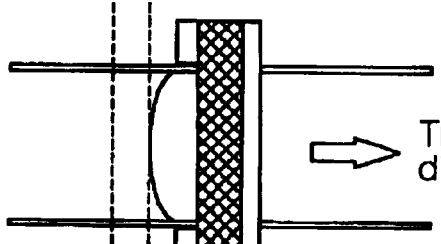
FIG. 23D
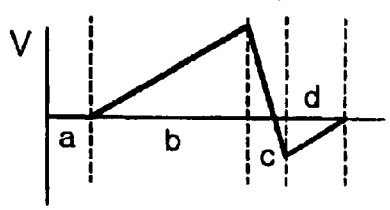

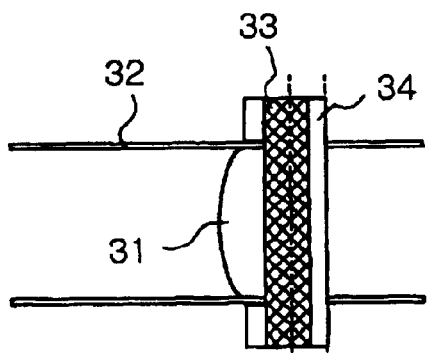
FIG. 24A
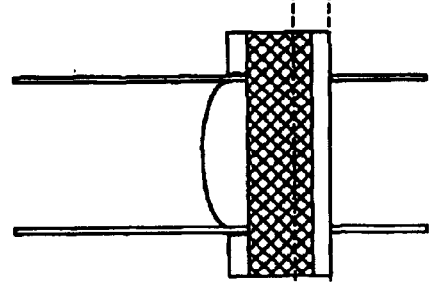
FIG. 24B
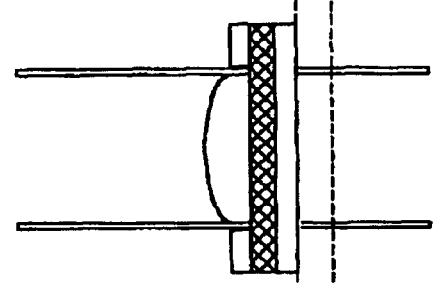
FIG. 24C
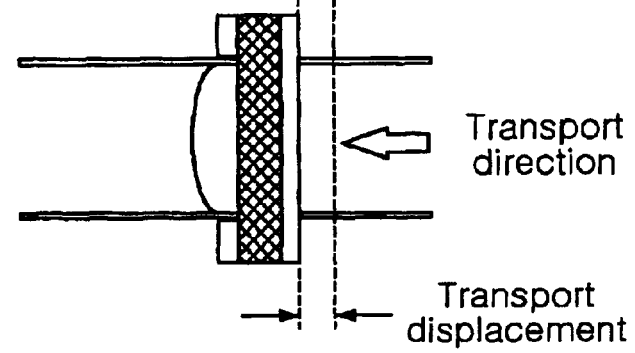
FIG. 24D
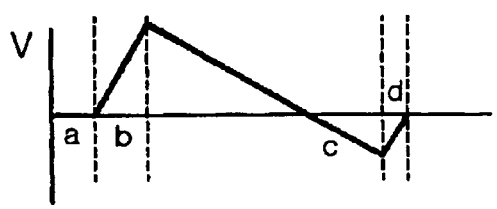

DRIVING DEVICE

BACKGROUND OF THE INVENTION

1. Field of the Invention

The present invention relates to a driving device, and more particularly, to a lens driving device for transporting a lens of an optical instrument via separate actuation of the lens itself.

2. Description of the Related Art

Various optical instruments such as a camera, a camcorder, a zoom camera, an observation camera, an optics in a Micro Air Vehicle (MAV), etc. have a lens structure which enables reciprocating movement of a lens for zooming. There have been developed several structures for transporting the lens for such zooming.

A conventional driving technique based upon a cam structure has been conventionally used for zooming to vary a focal length. The cam structure-based driving technique executes zooming by varying the relative spacing of lenses along a lens barrel, which is driven by an electromagnetic motor, and a cam-shaped groove placed in a lateral portion of the lens barrel. The cam structure-based zooming technique determines the relative position of each lens according to the configuration of a cam. Therefore, there are drawbacks in that a driving unit and a focusing lens for setting a focus at a specific magnification are further required and a driving mechanism including a driven reduction gear and a lens holding structure which moves along the cam is complicated.

Recently, there is developed a micro optical zoom mechanism in order to overcome the above drawbacks as well as to impart a zooming function to a micro optical instrument. According to the current trend, the micro optical instrument employs an intelligent device such as a piezoelectric element rather than the conventional driving technique using the electromagnetic motor. Substituting the piezoelectric element for the conventional motor driving technique has advantages that a driving structure can be simplified and high efficiency can be realized owing to a direct drive mechanism.

FIG. 1 shows an example of a zoom lens device using such a piezoelectric element which is disclosed in U.S. Pat. No. 6,215,605, entitled "Driving Device." The lens driving device in FIG. 1 fixes piezoelectric actuators 111 and 112 and transfers the displacement to driving rods 116 and 117 so as to transport lenses L2 and L4 under effects of the preload from projections 131a and 132a and inertia and acceleration of lens holders 131 and 132. The piezoelectric actuator 112, according to the waveform of exciting input, transports the lens by enabling the lens holder to move together with the driving rod or to slide and stay in position. The piezoelectric actuator 112 can also transport the lens through a reciprocating movement.

The lens driving device shown in FIG. 1 is arranged in use as shown in FIG. 2, in which the piezoelectric actuators 211a and 211b are arranged adjacent to each other. So, when a base block 213 receives any expansion/compression transferred from one of the piezoelectric actuators 211a and 211b, this expansion/compression may be also transferred to the other one of the piezoelectric actuators and thus its corresponding lens. Therefore, the base block 213 is provided with a groove 213g in order to block transfer of the expansion/compression between the piezoelectric actuators. However, the groove complicates the structure of the driving device while causing fabrication of the driving device difficult. Furthermore, the groove cannot completely block the expansion/compression interference between the piezoelectric actuators.

Further, the length of the driving rods 116 and 116, which reciprocate by the piezoelectric actuators to transport the lenses, is largely restricted according to the size of the piezoelectric actuators. Such restriction to the length of the driving rods acts as limitation to the transportable distance of the lens and thus disadvantageously affects qualities of a product incorporating the lens driving device.

Because the driving rods are essentially fixed, the conventional lens driving device has following problems: It is impossible to vary the length of the lens barrel on which the lenses are internally mounted. In addition to a space used for transport of the lens, an additional space for arranging driving elements is required. As a result, the overall size of the driving device is rarely reduced. Furthermore, the lens is partially supported by the driving rod so that asymmetric expansion/contraction may occur in the lens during actuation, thereby potentially making the lens driving operation unstable.

SUMMARY OF THE INVENTION

The present invention has been made to solve the foregoing problems and it is therefore an object of the present invention to provide a driving device which can integrate a lens with a driving mechanism to simplify the structure of a lens driving unit thereby reducing the size of a zoom lens unit.

It is another object of the invention to provide a driving device in which driving means can directly linearly drive a lens to obtain high driving efficiency as well as directly control the position of the lens.

It is another object of the invention to provide a driving device comprising a lens transport mechanism which enables the transport distance of the lens to be controlled without restriction by other components and the lens to be maintained in position without additional supply of energy.

It is further another object of the invention to provide a driving device which can execute precise focus control and precise magnification adjustment through ultra precise control of lens position in order to realize high resolution.

It is yet another object of the invention to provide a driving method allowing a number of transport modes to be used with the above driving device.

According to an aspect of the invention, there is provided a driving device for transporting an object, comprising: guide means connected with the object for guiding the object; and driving means attached to the object for providing the object a driving force which is larger than an interactive force between the object and the guide means.

Preferably, the driving means comprises a piezoelectric element fixed by a first end to the object and powered by a supply voltage, and a weight of a predetermined mass may be attached to a second end of the piezoelectric element opposite to the first end.

Preferably also, the driving device may further comprise elastic means for enabling elastic contact between the object and the guide means to provide the object and the guide means with an interactive force proportional to an elastic force.

More preferably, absolute values of the supply voltage per time fed to the piezoelectric element may be different from each other before and after a peak.

According to another aspect of the invention, there is provided a driving device for transporting a lens of an optical instrument, comprising: guide means connected perpendicularly with the lens for guiding reciprocating movement of the lens; and driving means arranged coplanar with the lens and fixed by a first end to a periphery of the lens for providing the lens with a transport force which is larger than an interactive force between the lens and the guide means.

Preferably, the driving means comprises a piezoelectric element powered by a supply voltage, a weight of a predetermined mass may be attached to a second end of the piezoelectric element opposite to the first end, and the piezoelectric element may comprise a plurality of element sections which are arranged in the periphery of the lens, spaced at an equal interval or be shaped as a ring surrounding an entire periphery of the lens.

Preferably also, the driving device may further comprise a lens frame for surrounding the periphery of the lens, wherein the first end of the piezoelectric element is fixed to the lens frame, and the guide means may be extended through the lens in a position adjacent to the periphery of the lens. Also, the guide means may comprise at least one bar of a polygonal cross section, or at least two bars of a circular cross section.

In addition, the driving device may further comprise elastic means for enabling elastic contact between the lens and the guide means to provide the lens and the guide means with an interactive force proportional to an elastic force, and absolute values of the supply voltage per time fed to the piezoelectric element may be different from each other before and after a peak.

According to other aspect of the invention, there is provided a driving device for transporting a lens in an optical instrument, comprising: guide means connected perpendicularly with the lens for guiding reciprocating movement of the lens; and driving means having a first end fixed perpendicularly to a face of the lens to provide the lens with a transport force which is larger than an interactive force between the lens and the guide means.

Preferably, the driving means may comprise a piezoelectric element powered by a supply voltage, and a weight of a predetermined mass may be attached to a second end of the piezoelectric element opposite to the first end.

Preferably also, the piezoelectric element may comprise a plurality of element sections arranged in the face of the lens adjacent to a periphery of the lens, spaced at an equal interval or be shaped as a ring arranged in the face of the lens adjacent to the periphery thereof.

It is preferred that the driving device may further comprise a lens frame for surrounding the periphery of the lens, wherein the first end of the piezoelectric element is fixed to the lens frame.

In addition, the driving device may further comprise elastic means for enabling elastic contact between the lens and the guide means to provide the lens and the guide means with an interactive force proportional to an elastic force.

Preferably, the guide means may be extended through the lens in a position adjacent to the periphery of the lens, and the guide means may comprise at least one bar of a polygonal cross section or at least two bars of a circular cross section.

Also, the guide means may preferably comprise an external frame contacting with a peripheral surface of the lens to guide reciprocating movement of the lens, wherein the lens may more preferably have at least one segment projected radially from the periphery of the lens, and the external frame has a recess formed along a route of the lens for receiving the projected segment, and wherein the piezoelectric element may be fixed with a portion of the projected segment.

Preferably, absolute values of the supply voltage per time fed to the piezoelectric element may be different from each other before and after a peak.

According to another aspect of the invention, there is provided a method of transporting a lens with the driving device of the invention, the method comprising the following steps of:

(a) moving the second end of the driving means along a transport direction of the lens at a first velocity; and (b) restoring the driving means to its original configuration at a second velocity faster than the first velocity of the second end of the driving means in the step (a) to move the lens which is fixed with the first end of the driving means.

Preferably, the driving means may comprise a piezoelectric element powered by a supply voltage, and wherein the supply voltage per time fed to the piezoelectric element in the step (a) has an absolute value smaller than that of the supply voltage in the step (b).

According to further another aspect of the invention, there is provided a method of transporting a lens with the driving device of the invention, the method comprising the following steps of:

(a) moving the second end of the driving means along a transport direction of the lens at a first velocity; and (b) operating the driving means at a second velocity faster than the first velocity of the second end of the driving means in the step (a) to move the lens, which is fixed to the first end of the driving means, along the transport direction of the lens beyond a position of the lens that will be achieved by restoration of the driving means to its original position; and (c) restoring the second end of the driving means to its original configuration.

Preferably, the driving means may comprise a piezoelectric element powered by a supply voltage, and wherein the supply voltage per time fed to the piezoelectric element in the step (a) has an absolute value smaller than that of the supply voltage in the step (b).

According to other aspect of the invention, there is provided a guide means connected perpendicularly with the lens for guiding reciprocating movement of the lens; elastic means for enabling elastic contact between the lens and the guide means to provide the lens and the guide means with an interactive force proportional to an elastic force; piezoelectric driving means being coplanar with the lens, having a first end fixed to a periphery of the lens, and powered by a supply voltage to provide the lens with a transport force which is larger than an interactive force between the lens and the guide means; and a weight of a predetermined mass attached to a second end of the piezoelectric driving means opposite to the first end.

Preferably, the piezoelectric driving means may comprise a plurality of sections which are arranged in the periphery of the lens, spaced at an equal interval or be shaped as a ring surrounding an entire periphery of the lens. Also, the driving device may further comprise a lens frame for surrounding the periphery of the lens, wherein the first end of the piezoelectric driving means is fixed to the lens frame.

Preferably also, the guide means may be extended through the lens in a position adjacent to the periphery of the lens, and the guide means may comprise at least one bar of a polygonal cross section or at least two bars of a circular cross section. Preferably, absolute values of the supply voltage per time fed to the piezoelectric element may be different from each other before and after a peak.

According to further another aspect of the invention, there is provided a driving device for transporting a lens of an optical instrument, comprising: guide means extended through the lens in a position adjacent to the periphery of the lens for guiding reciprocating movement of the lens; elastic means for enabling elastic contact between the lens and the guide means to provide the lens and the guide means with an interactive force proportional to an elastic force; piezoelectric driving means having a first end fixed perpendicularly to a face of the lens, and powered by a supply voltage to provide the lens with a transport force which is larger than an interactive force between the lens and the guide means; and a weight of a predetermined mass attached to a second end of the piezoelectric driving means opposite to the first end.

Preferably, the piezoelectric element may comprise a plurality of element sections arranged in the face of the lens adjacent to a periphery of the lens, spaced at an equal interval or be shaped as a ring arranged in the face of the lens adjacent to the periphery thereof.

Preferably also, the driving device may further comprise a lens frame for surrounding the periphery of the lens, wherein the first end of the piezoelectric element is fixed to the lens frame, and the guide means may comprise at least one bar of a polygonal cross section or at least two bars of a circular cross section.

Preferably, absolute values of the supply voltage per time fed to the piezoelectric element may be different from each other before and after a peak.

According to still another aspect of the invention, there is provided a driving device for transporting a lens of an optical instrument, comprising: an external frame being in contact with a peripheral surface of the lens for guiding reciprocating movement of the lens; elastic means for enabling elastic contact between the lens and the external frame to provide the lens and the external frame with an interactive force proportional to an elastic force; piezoelectric driving means having a first end fixed perpendicularly to a face of the lens, and powered by a supply voltage to provide the lens with a transport force which is larger than an interactive force between the lens and the guide means; and a weight of a predetermined mass attached to a second end of the piezoelectric driving means opposite to the first end.

Preferably, the piezoelectric element may comprise a plurality of element sections arranged in the face of the lens adjacent to a periphery of the lens, spaced at an equal interval or being shaped as a ring arranged in the face of the lens adjacent to the periphery thereof.

Preferably also, the driving device may further comprise a lens frame for surrounding the periphery of the lens, wherein the first end of the piezoelectric element is fixed to the lens frame.

It is also preferred that the lens has at least one segment projected radially from the periphery of the lens, and wherein the external frame has a recess formed along a route of the lens for receiving the projected segment, wherein the piezoelectric element is fixed with a portion of the projected segment. Also, absolute values of the supply voltage per time fed to the piezoelectric element may be preferably different from each other before and after a peak.

BRIEF DESCRIPTION OF THE DRAWINGS

The above and other objects, features and other advantages of the present invention will be more clearly understood from the following detailed description taken in conjunction with the accompanying drawings, in which:

FIG. 11 is a diagram illustrating an operation mode of the driving device shown in FIG. 3;

FIG. 12 is a diagram illustrating another operation mode of the driving device shown in FIG. 3;

FIG. 14 is a diagram illustrating still another operation mode of the driving device shown in FIG. 3;

FIG. 21 is a diagram illustrating an operation mode of the driving device shown in FIG. 14;

FIG. 22 is a diagram illustrating another operation mode of the driving device shown in FIG. 14;

FIG. 23 is a diagram illustrating further another operation mode of the driving device shown in FIG. 14;

FIG. 24 is a diagram illustrating still another operation mode of the driving device shown in FIG. 14.

DETAILED DESCRIPTION OF THE PREFERRED EMBODIMENT

The following detailed description will present preferred embodiments of the invention with reference to the accompanying drawings.

According to an aspect of the invention, a driving device of the invention is directly attached to an object to be transported or a zoom lens in an optical instrument in order to directly drive and transport the object or lens for a desired distance.

Figure 1:
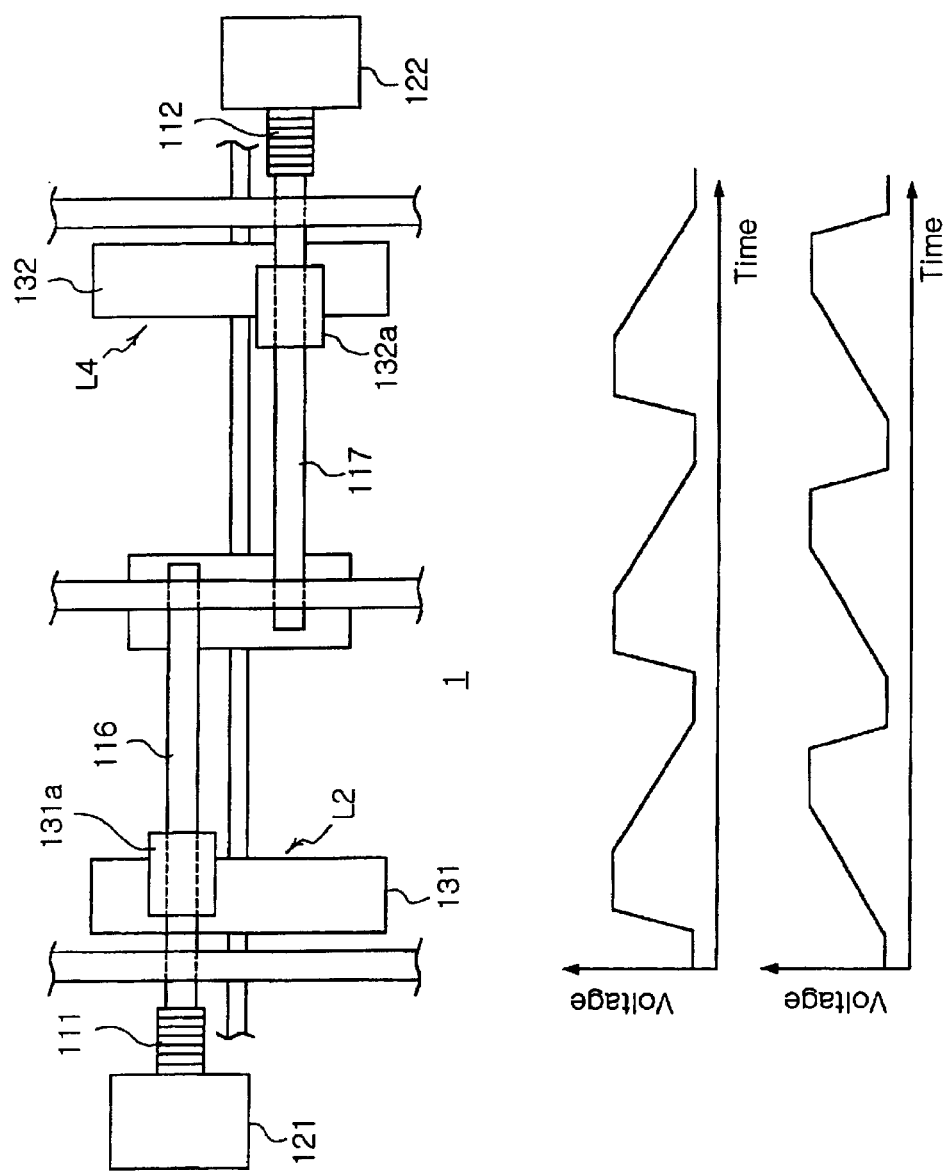
FIG. 1 is a sectional view of a conventional lens driving device.
Figure 2:
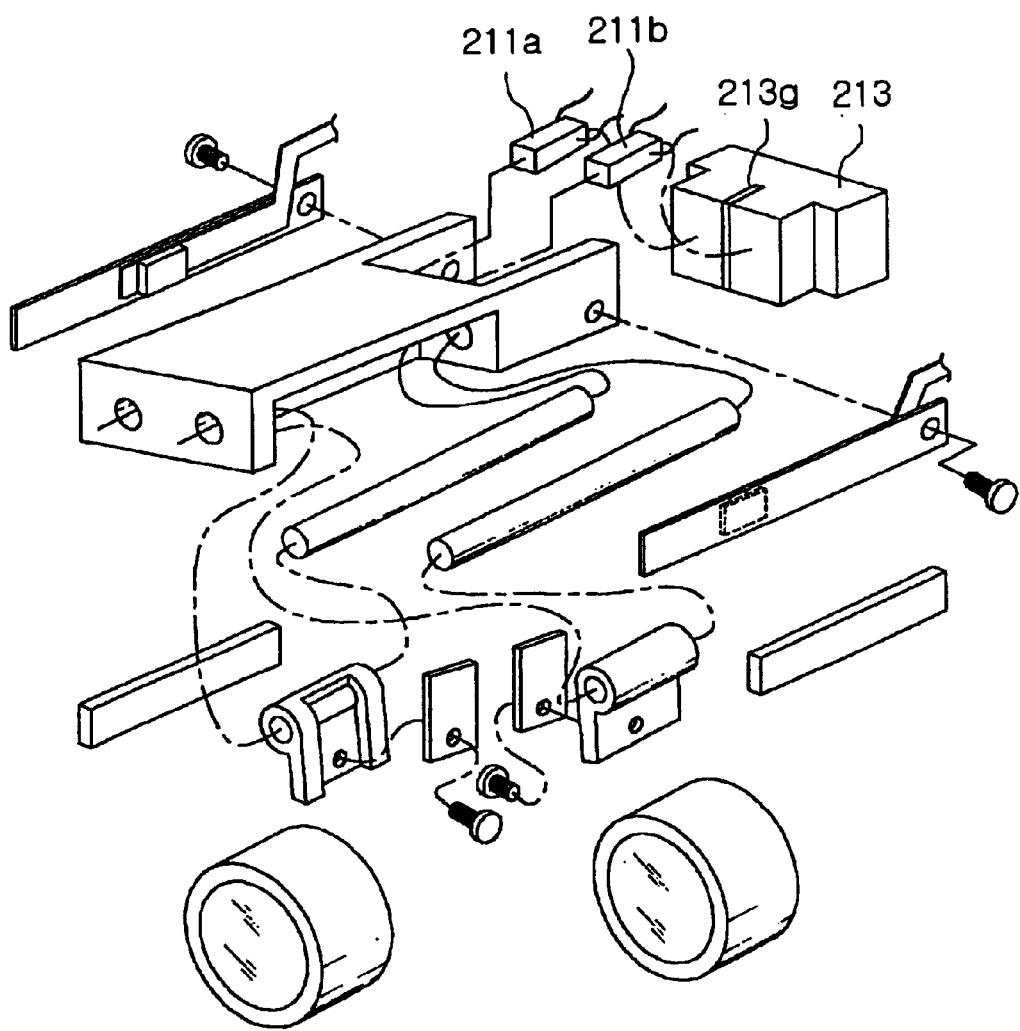
FIG. 2 is an exploded view of the lens driving device shown in FIG. 1.
Figure 3:
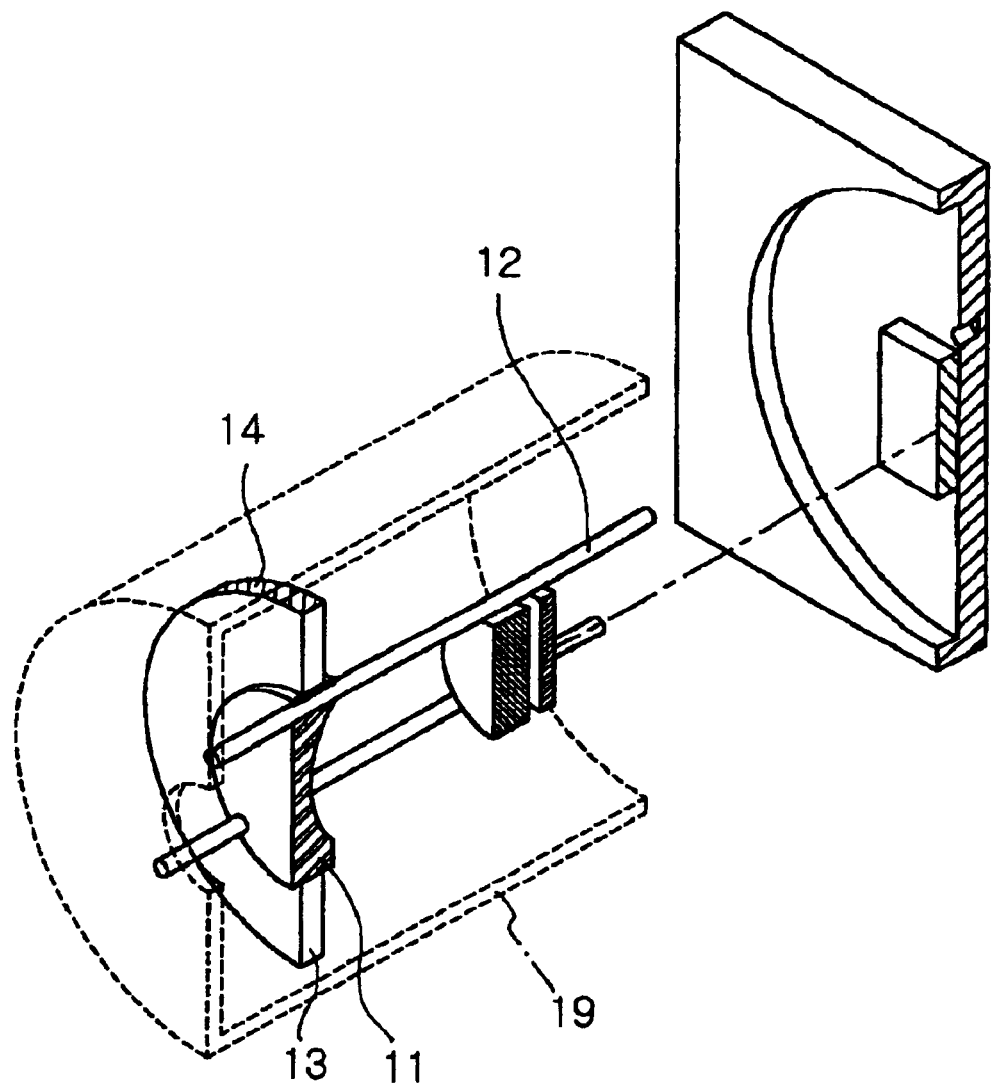
FIG. 3 is a partial perspective view of a driving device according to a first embodiment of the invention.

FIG. 3 is a partial perspective view of a driving device according to a first embodiment of the invention. Referring to FIG. 3, the driving device 10 according to the first embodiment of the invention comprises guide means 12 and driving means 13 to transport a lens 11.

The guide means 12 are adapted to guide the lens 11 when the lens 11 is transported, and connected perpendicularly with the lens 11. The guide means 12 are preferably extended through the lens 11 in positions adjacent to the periphery of the lens 11.

The driving means 13 is arranged coplanar with the lens 11, and has one end or the inner periphery attached to the periphery of the lens 11. The driving means 13 can apply its own transport force to the lens, and in this embodiment, comprises a piezoelectric element made of piezoelectric material.

Figure 4A:
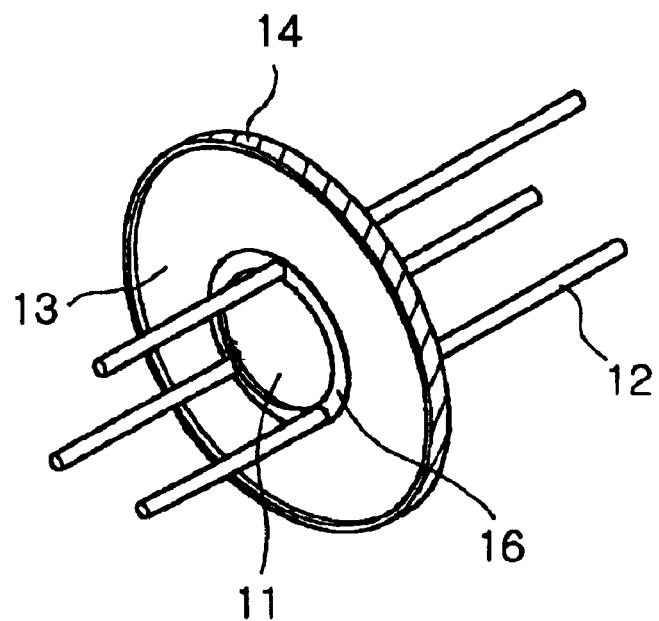
FIG. 4A is a perspective view of the driving device shown in FIG. 3.
Figure 4B:
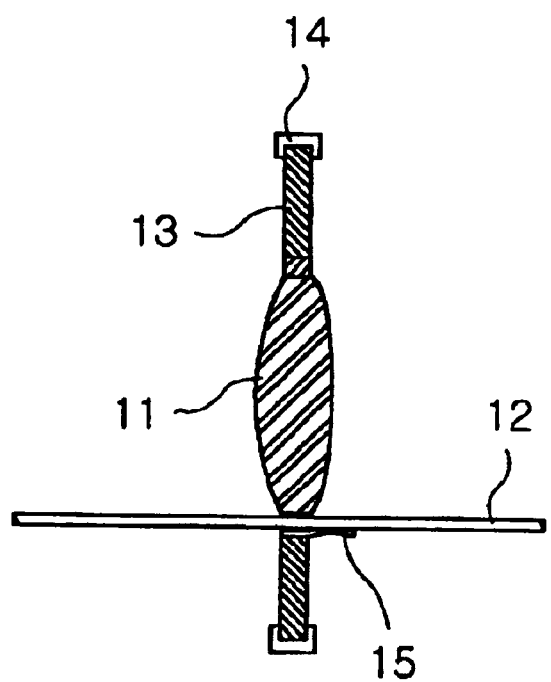
FIG. 4B is a sectional view of the driving device shown in FIG. 4A.

Referring to FIGS. 4A and 4B, the guide means 12 are extended through the lens 11, and the driving means 13 is arranged around the lens 11. Further, a mass or weight 14 is attached to the outer periphery of the driving means 13. The weight 14 facilitates transfer of the transport force from the driving means to the lens, and will be described later. Further, in FIG. 4B, elastic means 15 is arranged between the guide means 12 and the lens 11.

The driving device of the invention is characterized in that the driving means 13 of the piezoelectric element directly drives the lens 11 along the guide means 12. The piezoelectric element may comprise composite oxide material such as PZT. PZT is taken from initials of Pb, Zr and Ti and also called piezoelectric material. Pressed piezoelectric material instantaneously generates current, and on the contrary, becomes distorted when applied with current.

The present invention takes advantage of these properties of the piezoelectric element. That is, the invention distorts the piezoelectric element by applying current thereto and then directly transports the lens based upon an acceleration force during distortion.

Figure 5A:
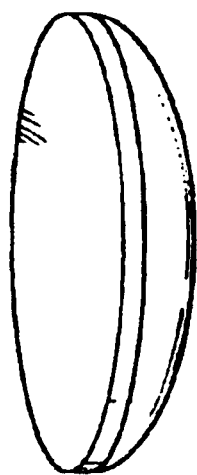
FIG. 5 illustrates operating states of driving means of the driving device shown in FIG. 3.
Figure 5B:
Figure 5C:
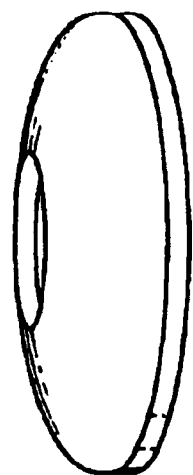

FIG. 5 illustrates the operation of the piezoelectric element. Referring to FIG. 5, the piezoelectric element as the driving means 13 remains flat at zero voltage (b), and application of a positive voltage causes the piezoelectric element to be distorted forward (a). On the contrary, if a negative voltage is applied, the piezoelectric element is distorted backward or reverse (c). The piezoelectric element shows distortion or change in contour according to characteristics of the voltage applied thereto, and the invention uses acceleration according to distortion of the piezoelectric element.

In this embodiment, the guide means 12 movably supports the lens, and are so adjusted that a predetermined amount of interactive force or frictional force acts between the lens 11 and the guide means 12. FIG. 11 illustrates an operation sequence of the driving means of the first embodiment. In Step a, the lens 11 is supported by the guide means 12 and the driving means 13 or the piezoelectric element is attached to the periphery of the lens. The weight 14 of a predetermined mass is attached to the outer periphery of the driving means 13.

In Step b, a voltage is applied to the driving means 13 to move the weight 14 along a transport direction, that is, a direction that the lens is transported on the guide means.

Step b is performed based upon characteristics of the piezoelectric element, and applies the voltage at a slow voltage slope to the piezoelectric element to bend the piezoelectric element along the transport direction. At this time, the lens 11 maintains its position based upon the frictional force with the guide means 12.

In Step c, a voltage applied to the driving means 13 or the piezoelectric element is canceled at a slope which is extremely larger than the voltage slope in Step b. Then, the piezoelectric element is restored to the original configuration at a very rapid speed to overcome the frictional force between the lens 11 and the guide means 12. The weight 14 attached to the outer periphery of the piezoelectric element serves as a reference point when the voltage is rapidly canceled. That is, the center of mass of the whole driving device is biassed toward the weight along the transport direction of the lens so that the piezoelectric element moves toward the weight along the transport direction thereof to return to its original flat configuration and thus the lens is transported along with the piezoelectric element to a position adjacent to the weight.

Because the piezoelectric element has its own mass, the afore described transport operation can be executed without aid of the weight by adjusting the mass of the piezoelectric element. However, application of the weight enables the driving device to transport the lens more effectively.

Figure 8:
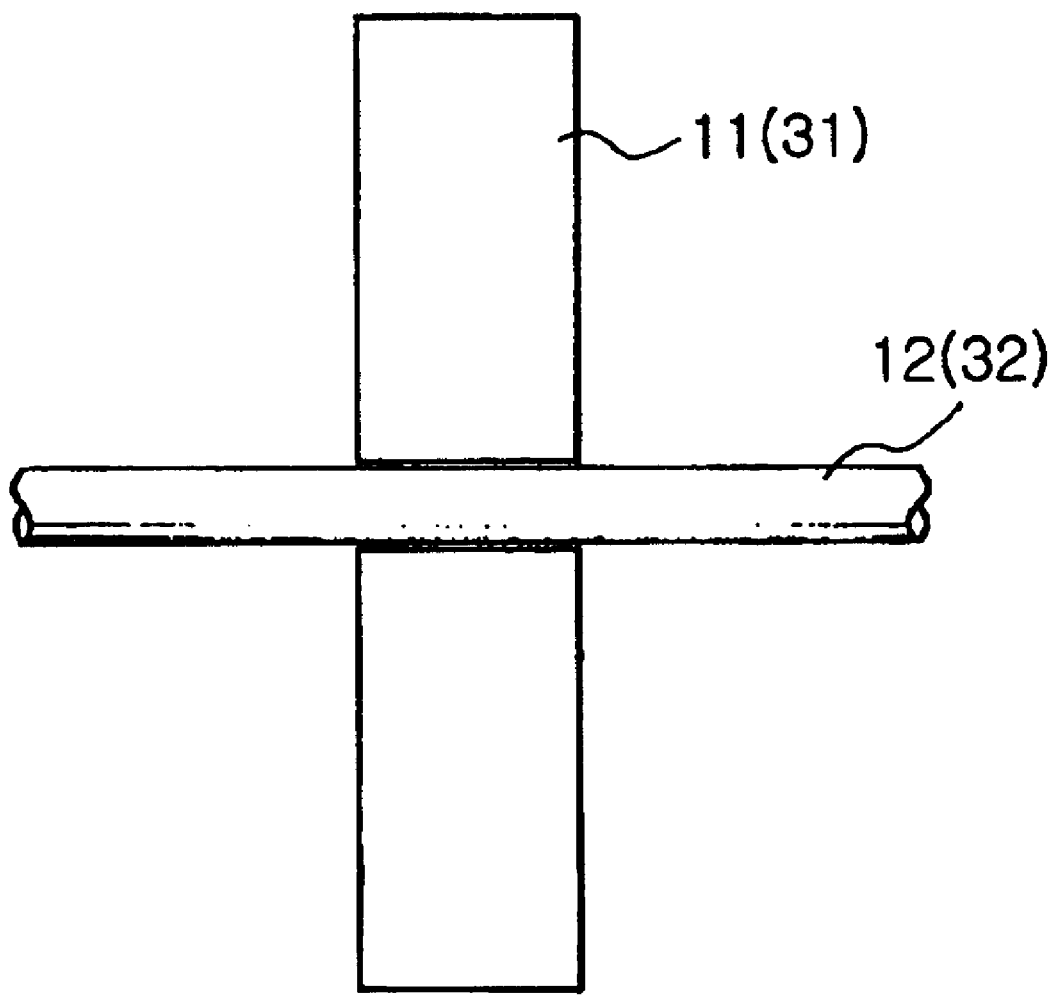
FIG. 8 is a sectional view illustrating connection between guide means and the driving means of the driving device shown in FIG. 3.

In order to carry out the above operation, the first embodiment of the invention is so designed that the driving means 13 or the piezoelectric element is attached to the periphery of the lens 12 and the lens 11 is guided by the guide means 12. Further, the lens 11 and the guide means 12 are connected to each other so that the interactive force or frictional force acts between the lens 11 and the guide means 12. That is, the frictional force can be regulated by putting the guide means through the lens in a tight fit relation or properly adjusting the surface roughness of contact faces of the guide means and the lens (FIG. 8).

Figure 9:
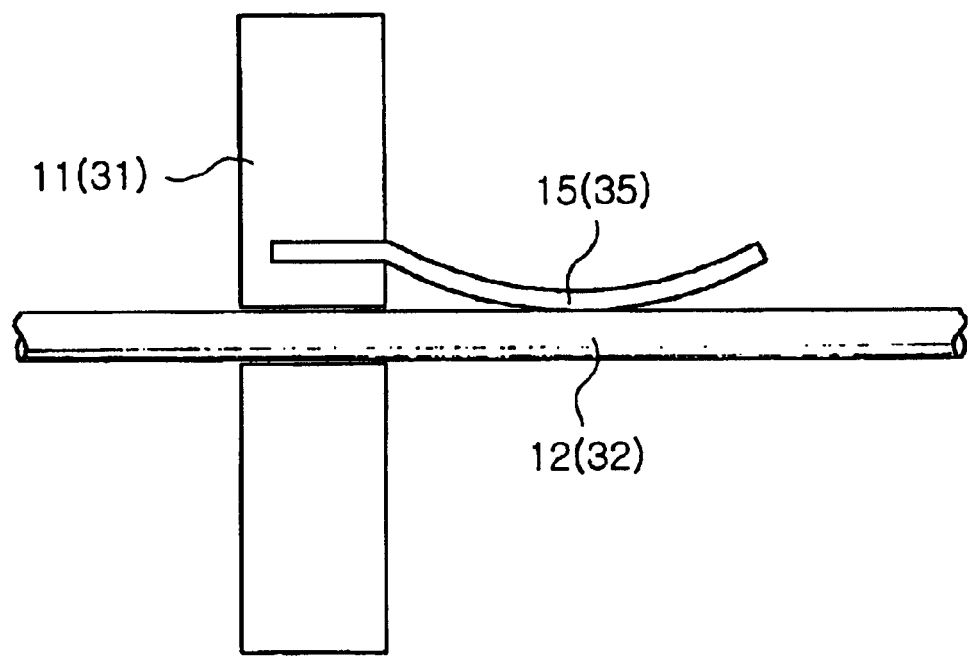
FIG. 9 is a sectional view illustrating elastic means of the driving device shown in FIG. 3.

Besides the above technique, the invention can employ the elastic means 15 as shown in FIGS. 4B and 9 in order to impart a predetermined amount of frictional force. The elastic means 15 is arranged between the lens 11 and the guide means 12 to apply a predetermined amount of interactive force to both the lens and the guide means. In this case, the elastic means 15 employs a leaf spring and the like which has one end fixed to the lens 11 and other portion in contact with the guide means 12.

The frictional force between the lens 11 and the guide means 12 is proportional to friction coefficient and vertical load, in which the elastic means 15 applies vertical load between the lens and the guide means so that the lens can maintain a fixed stationary position even under external impact and/or regardless of the position of a lens barrel.

Figure 7:
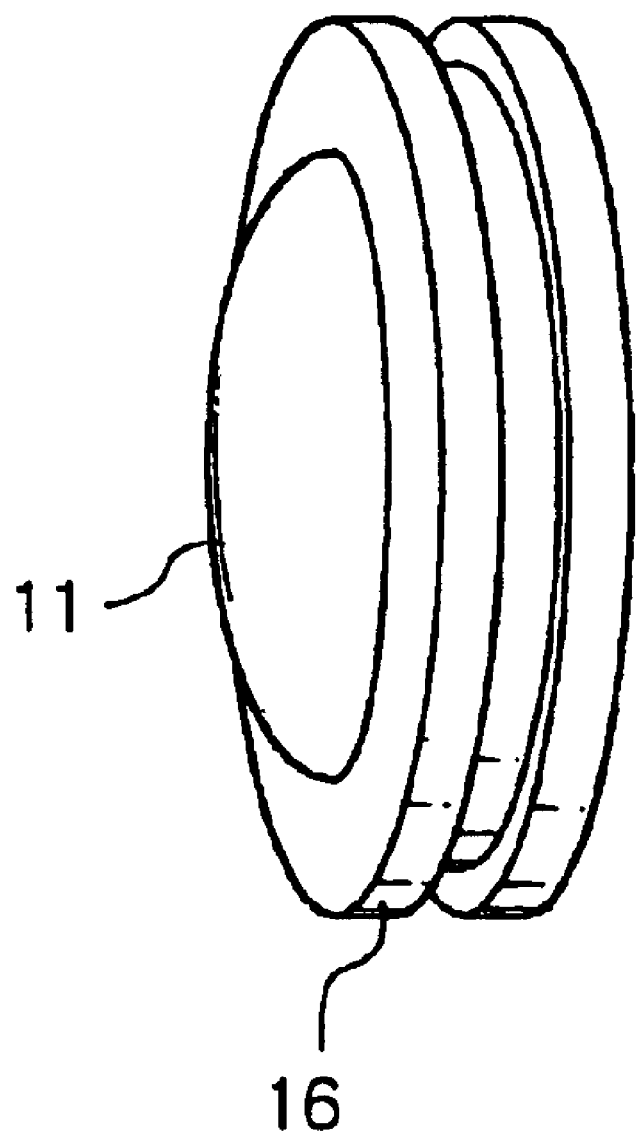
FIG. 7 is a perspective view of a lens frame of the driving device shown in FIG. 3.

FIG. 7 illustrates a lens frame 16. In this alternative structure, preferably, the lens 11 is fixed to the lens frame 16 and the piezoelectric element is fixedly inserted into a groove around the lens frame or bonded thereto. One end or the inner periphery of the piezoelectric element is fixed to the lens frame and the other end or the outer periphery remains as a free end or free ends. The lens frame is preferably made of rigid material. If the lens frame is flexible, the transport force from the driving means will be absorbed by the flexible lens frame and thus not be transferred to the lens. Therefore, the lens frame is preferably made of rigid material such as steel.

The piezoelectric element or the driving means 13 can be ring-shaped to surround the entire periphery of the lens 11 as shown in FIGS. 3 and 4B. As the piezoelectric element is ring-shaped, the transport force can be applied uniformly across the lens. Alternatively, as shown in FIG. 10, a plurality of piezoelectric element sections may be arranged in the periphery of the lens, spaced at an equal interval.

Figure 10:
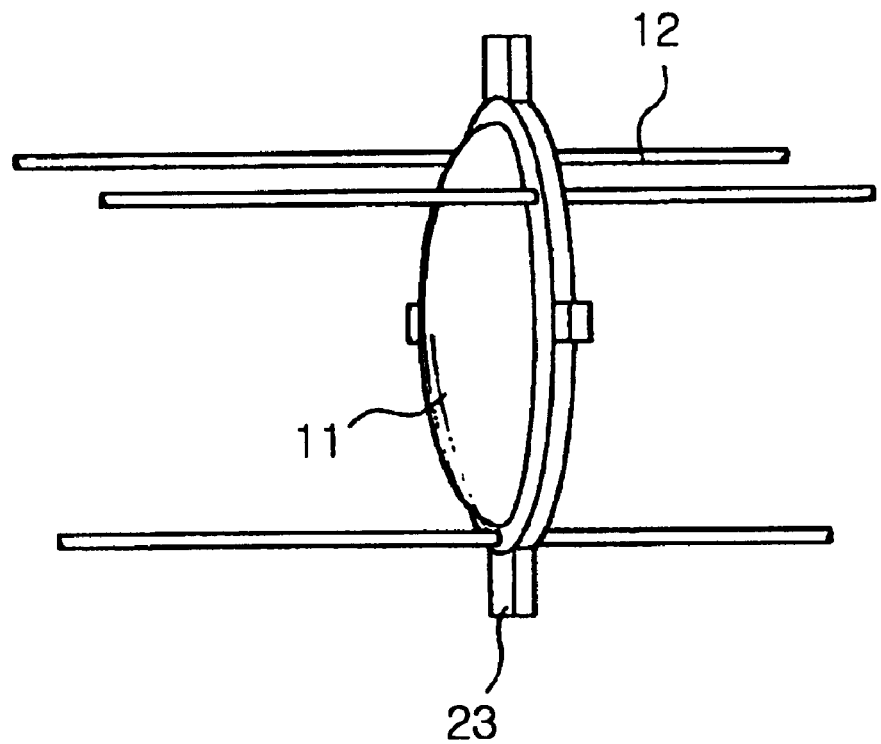
FIG. 10 is a perspective view of an alternative to the driving means of the driving device shown in FIG. 3.

Referring to FIG. 10, the piezoelectric element sections 23 are arranged coplanar with the lens in the periphery of the lens 11, spaced at the equal interval. The piezoelectric element sections 23 have the same size and modulus of strain and are arranged around the lens and spaced at the same angle so that the transport force is uniformly transferred to the lens 11 without being biassed. Such arrangement can reduce consumption of piezoelectric material, and it to be understood that the quantity of the piezoelectric material can be properly adjusted according to the desired amount of transport force.

In this embodiment, the guide means 12 are extended through the lens 11 in positions adjacent to the periphery of the lens 11. As shown in FIG. 3, since the guide means 12 are formed as bars of a circular cross section, the guide means 12 are comprised of at least two bars extended through the lens, which are placed one over the other or in any configuration in order to prevent shaking of the lens according to gravity.

Figure 6:
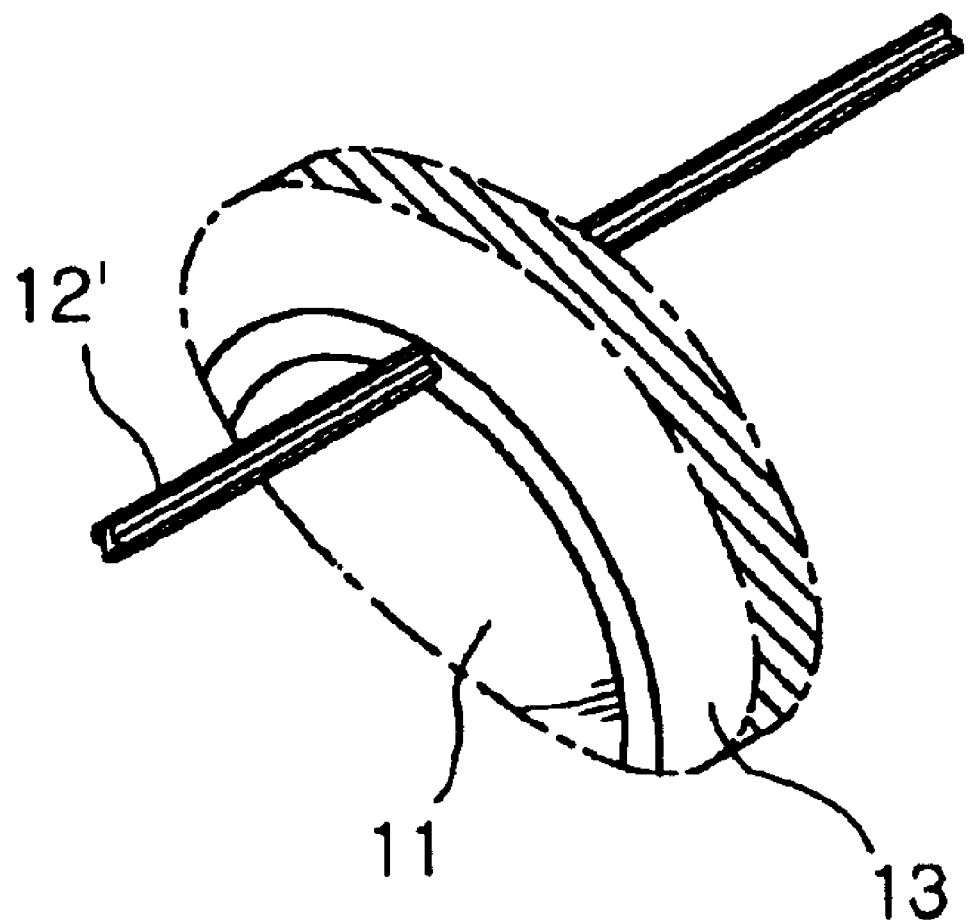
FIG. 6 illustrates an example of guide means of the driving device shown in FIG. 3.

Alternatively, the guide means 12 is comprised of at least one bar of a polygonal cross section as shown in FIG. 6. The polygonal bar prevents the lens 11 from turning around the bar so that the lens 11 maintains its position around the bar. The polygonal bar may have various cross sectional configurations such as triangle, quadrangle, pentagon, hexagon, etc. When the bar has such a polygonal configuration, at least one polygonal bar can prevent shaking of the lens while enabling the lens to be transported.

The driving device 10 according to the first embodiment of the invention is characterized in generating an acceleration force according to the waveform of voltage applied to the driving means 13 so that the driving means can move the lens based upon the acceleration force. The driving means 13 of this embodiment comprises the piezoelectric element, and the voltage waveform applied to the piezoelectric element is shown in FIG. 11.

As shown in a lower part of FIG. 11, the voltage V is elevated at a slow slope in Step b, in which the piezoelectric element is bent by its outer periphery toward the transport direction, restrained by the frictional force between the lens and the guide means. After being elevated up to a peak point, the voltage drops at a sharp slope in Step c so that the piezoelectric element is restored to its original position from the distorted position, in which the piezoelectric element was bent and biassed along the transport direction. Then, the lens advances forward against the frictional force from the guide means.

FIG. 12 illustrates an operation mode reverse to that shown in FIG. 11. In FIG. 12, Step b has a voltage waveform rising at a sharp slope, and when a voltage V as shown in Step b is applied to the driving means of the driving device, the piezoelectric element abruptly applies an acceleration force to the lens so that the lens can advance along the transport direction against the frictional force from the guide means. Then, the voltage waveform declines at a slow slope in Step c, in which the lens remains stationary resulting from the frictional force with the guide means and the bent outer periphery of the piezoelectric element is restored along the transport direction and unfolded to the original flat configuration.

As shown FIGS. 11 and 12, in order to actuate the driving means according to the embodiment of the invention, it is required that voltage V per time or the voltage waveform has different absolute values before and after a peak. In particular, in a region of a sharp slope, the acceleration force resulting from elevation or drop of a voltage phase is required to overcome the interactive force or frictional force between the lens and the guide means.

Figures 13A, 13B, 13C, 13D:
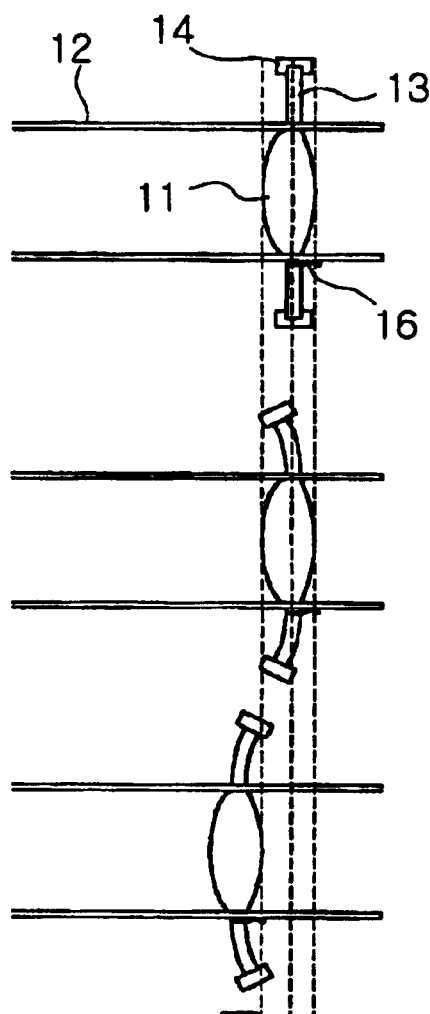
FIG. 13 is a diagram illustrating further another operation mode of the driving device shown in FIG. 3.

FIGS. 13 and 14 illustrate alternative operation modes of the driving device according to the first embodiment of the invention. While the operation modes in FIGS. 11 and 12 are referred to as basic modes, those operation modes in FIGS. 13 and 14 can be referred to as speed modes.

In FIG. 13, the driving device accomplishes one operation through three steps. First, in Step b, a voltage V applied to the driving means 13 of the driving device rises at a slow slope. In this case, the lens 11 remains stationary resulting from a frictional force between the lens and the guide means while the outer periphery of the piezoelectric element or the driving means is bent along the transport direction of the lens. In Step c, the voltage V applied to the piezoelectric element drops at a sharp slope to have a negative phase. Owing to such variation of the voltage, the piezoelectric element is unfolded to the original configuration and then bent to the opposite direction. Because Step c is performed rapidly, an inertia force acts on the weight which is offset forward and thus restrains the same stationary, and the piezoelectric element transports the lens forward about the weight along the guide means. The bent piezoelectric element is restored to the flat configuration in Step d, where the voltage V has a slow slope as in the above Step b.

Unlike the operation mode in FIG. 13, the operation mode in FIG. 14 applies an acceleration force to transport the lens in Steps b and d, and supplies a slow slope of voltage to bend the piezoelectric element forward/backward in Step c.

Compared with the operation modes in FIGS. 11 and 12, the operation modes in FIGS. 13 and 14 can be referred to as speed modes since they implement two displacements in one cycle. Therefore, these speed modes can advantageously transport the lens more rapidly than the basic modes in FIGS. 11 and 12.

Likewise in FIGS. 11 and 12, it is required that voltage V per time or the voltage waveform has different absolute values before and after a peak in order to actuate the driving means according to the embodiment of the invention as shown in FIGS. 13 and 14. In particular, in a region of a sharp slope, the acceleration force resulting from elevation or drop of a voltage phase is required to overcome the interactive force or frictional force between the lens and the guide means.

Figure 15:
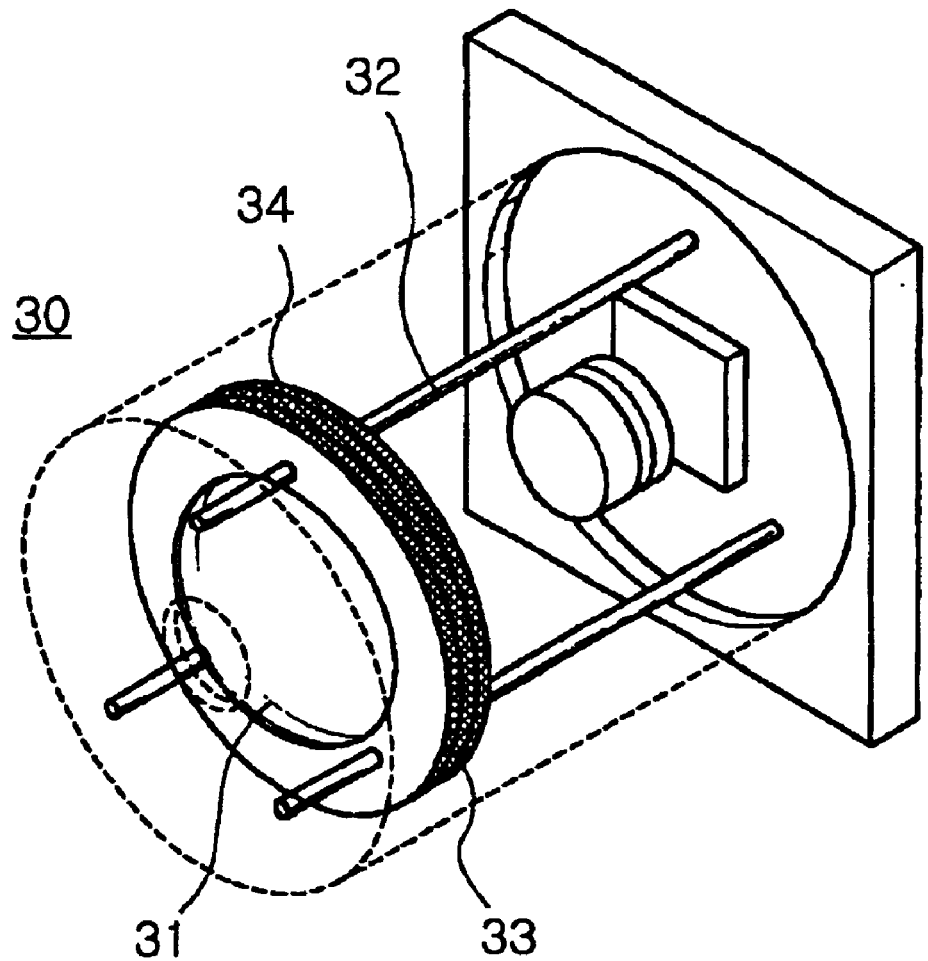
FIG. 15 is an overall perspective view of a driving device according to a second embodiment of the invention.

FIG. 15 is an overall perspective view of a driving device according to a second embodiment of the invention. Like the first embodiment, the driving device 30 of the second embodiment comprises guide means 32 and driving means 33 to transport a lens 31. The driving means 33 of the second embodiment is arranged different from that of the first embodiment.

The guide means 32 serve to guide the lens 31 while the lens 31 is being transported, and connected perpendicularly with the lens 31. The driving means 33 can apply its own transport force to the lens and comprises a piezoelectric element made of piezoelectric material as in the first embodiment.

In the driving device of the second embodiment, the guide means 32 movably support the lens, and are adjusted so that a predetermined amount of interactive force or frictional force acts between the lens and the guide means 32. The driving means or piezoelectric element 33 employed as the driving means are attached to a rear portion of the lens 31 in a perpendicular direction, parallel to the guide means 32.

Figure 16A:
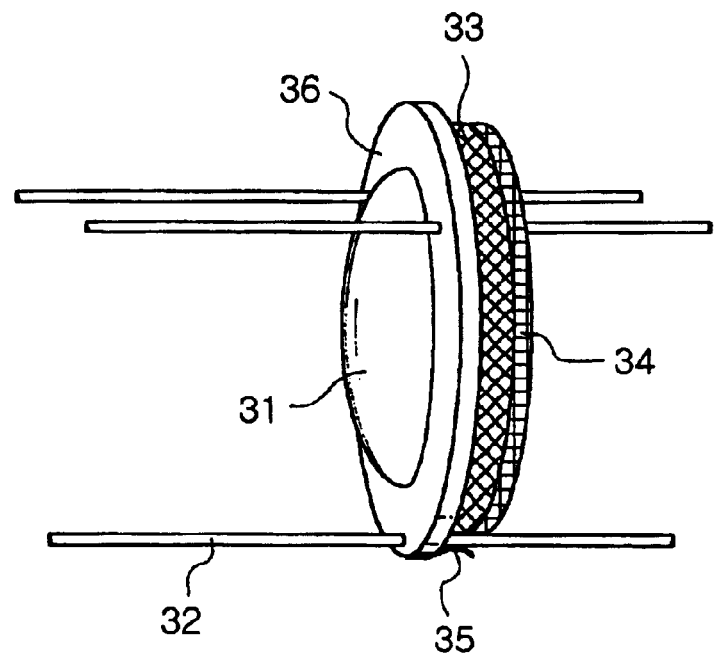
FIG. 16A is a perspective view of the driving device shown in FIG. 15.
Figure 16B:
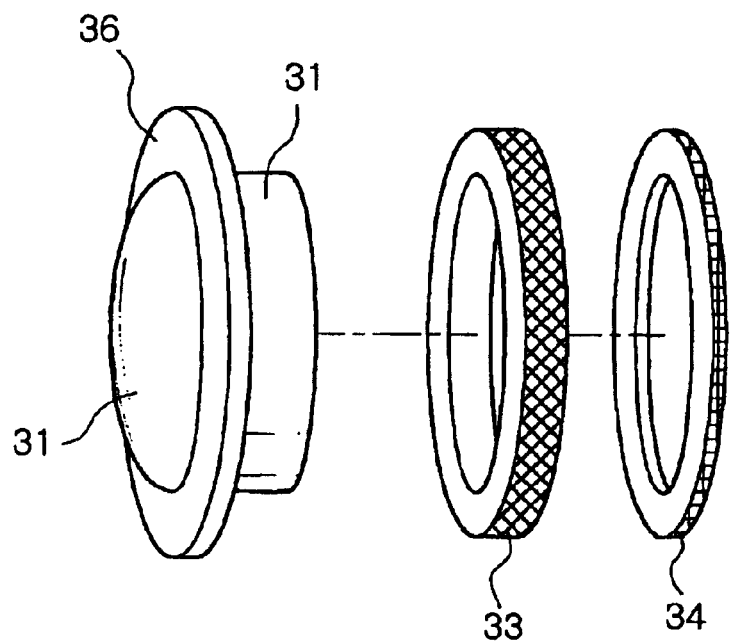
FIG. 16B is an exploded view of the driving device shown in FIG. 15.

This structure is shown more particularly in FIGS. 16A and 16B. FIG. 16A shows that the lens 31 is coupled with a lens frame 36 and the piezoelectric element 33 is attached to a rear face of the lens frame 36. A weight 34 is attached to a distal end of the piezoelectric element, and the guide means 32 are extended through the lens frame 36. Elastic means 35 is arranged between the guide means and the lens frame.

The lens frame 36 is shaped to surround the lens, and a proximal end of the piezoelectric element is fixed to a rear face of the lens frame. Although FIGS. 16A and 16B illustrate the lens frame 36, alternatively, the lens itself can be connected with the piezoelectric element without any lens frame. In this case, the guide means 32 are extended through the lens 31 in positions adjacent to the periphery of the lens.

The driving means in the second embodiment comprises the piezoelectric element made of PZT, and directly transports the lens based upon an acceleration force during distortion in the same basis as described in the first embodiment. The operation of the piezoelectric element in the second embodiment can be seen in FIG. 17.

Figure 17A:
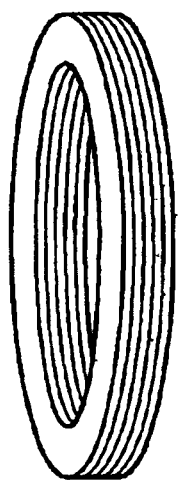
FIG. 17 illustrates operating states of driving means of the driving device shown in FIG. 15.
Figure 17B:
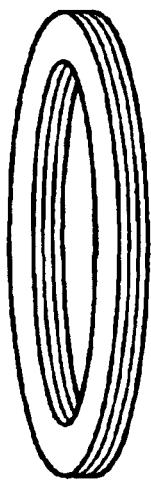
Figure 17C:
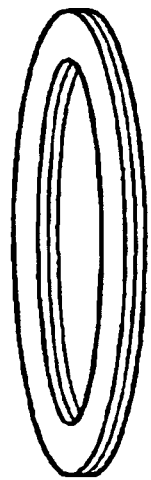

Referring to FIG. 17, the piezoelectric element as the driving means 33 maintains its original configuration of a predetermined thickness at zero voltage (b). Application of a positive voltage causes the piezoelectric element to have a thickened or expanded configuration (a), that is, spacings of piezoelectric element layers, which are stacked one on another, are enlarged to thicken the overall piezoelectric element. On the contrary, if a negative voltage is applied, the piezoelectric element is thinned or contracted. The piezoelectric element in this embodiment has shape change or expansion/contraction to take advantage of an acceleration force resulting from such shape change.

FIG. 21 is a diagram illustrating an operation mode of the driving device of the second embodiment. Referring to FIG. 21, the piezoelectric element 33 is attached by the proximal end with the lens 31 and by the distal end with the weight 34 in Step a.

In Step b, a voltage V is applied to the piezoelectric element as the driving means 33 to move the weight 34 along the transport direction of the lens. This is performed based upon characteristics of the piezoelectric element as the driving means, in which a voltage waveform of a slow slope is applied to the piezoelectric element to expand the piezoelectric element along the transport direction. Then, the lens 31 remains stationary in position resulting from the frictional force with the guide means 32.

In Step c, the voltage V applied to the piezoelectric element or driving means 33 is canceled at a slope which is extremely steeper than the voltage slope in Step b. Then, the piezoelectric element is restored to its original configuration at an extremely high speed to overcome the frictional force between the lens 31 and the guide means 32. The weight 34 attached to the distal end of the piezoelectric element acts as a reference point when the voltage is canceled rapidly. That is, the center of mass of the whole driving device is biased toward the weight 34 along the transport direction of the lens so that the piezoelectric element is restored toward the weight 34 and the lens is transported along with the piezoelectric element to a transport position adjacent to the weight 34.

Because the piezoelectric element has its own mass, the afore described transport operation can be executed without aid of the weight by adjusting the mass of the piezoelectric element. However, application of the weight enables the driving device to transport the lens more effectively.

In the afore described second embodiment, the lens 31 and the guide means 32 are connected to each other so that the interactive force or frictional force acts between the lens 31 and the guide means 32. That is, as in the first embodiment, the frictional force can be regulated by putting the guide means through the lens in a tight fit relation or properly adjusting the surface roughness of contact faces of the guide means and the lens (FIG. 8).

Besides the above technique, the invention can employ the elastic means 35 as shown in FIG. 16A (also refer to FIG. 9) in order to impart a predetermined amount of frictional force. The elastic means 35 is arranged between the lens 31 and the guide means 32 to apply a predetermined amount of interactive force to both the lens and the guide means. In this case, the elastic means 35 employs a leaf spring and the like which has one end fixed to the lens 31 and other portion in contact with the guide means 32.

As in the first embodiment, the frictional force between the lens 31 and the guide means 32 is proportional to friction coefficient and vertical load, in which the elastic means 35 applies vertical load between the lens and the guide means so that the lens can maintain a fixed stationary position even under external impact and/or regardless of the position of a lens barrel.

In this embodiment, preferably, the lens 31 is fixed to the lens frame 36 and the piezoelectric element is fixedly inserted into the rear face of the lens frame 36 or bonded thereto. The proximal end of the piezoelectric element is fixed to the lens frame and the distal end or the outer periphery remains as a free end. The lens frame is preferably made of rigid material. If the lens frame is flexible, the transport force from the driving means will be absorbed by the flexible lens frame and thus not be transferred to the lens. Therefore, the lens frame is preferably made of rigid material such as steel.

The piezoelectric element or the driving means 33 can be shaped as a ring for being attached to one side of the lens 31 adjacent to the periphery of the lens. As the piezoelectric element is ring-shaped, the transport force can be applied uniformly across the lens. Alternatively, as shown in FIG. 25, a plurality of piezoelectric element sections may be arranged in the periphery of the lens, spaced at an equal interval.

Figure 25:
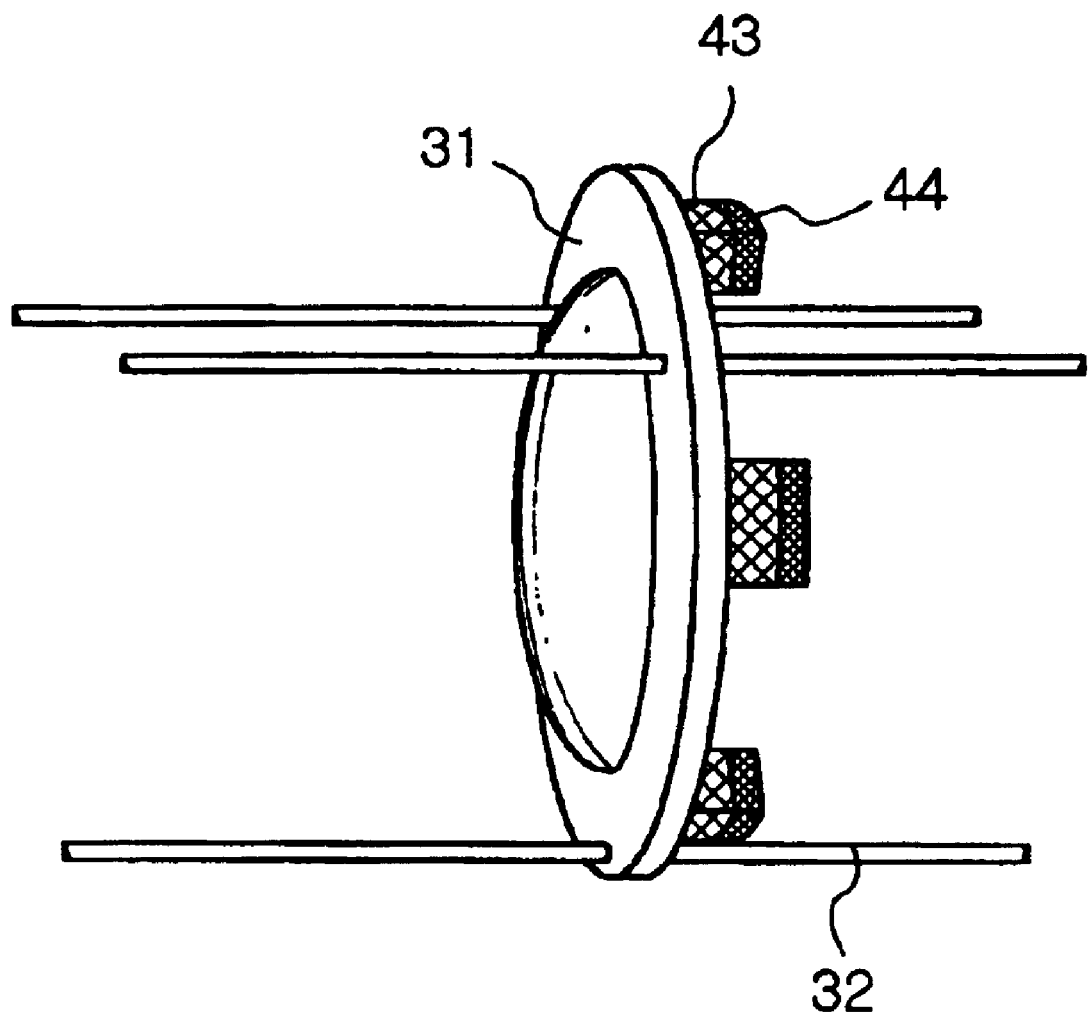
FIG. 25 is a perspective view of an alternative to the driving means of the driving device shown in FIG. 14.

Referring to FIG. 25, the piezoelectric element sections 43 are arranged perpendicular to the lens 31 in one side, that is, the rear face of thereof, spaced at an equal interval. The piezoelectric element sections 43 have the same size and modulus of strain and are arranged around the lens and spaced at the same angle so that the transport force is uniformly transferred to the lens 31 without being biassed. Such arrangement can reduce consumption of piezoelectric material, and it is to be understood that the quantity of the piezoelectric material can be properly adjusted according to the desired amount of transport force.

In this embodiment, the guide means 32 are extended through the lens 31 in positions adjacent to the periphery of the lens 31. As shown in FIG. 15, since the guide means 32 are formed as bars of a circular cross section, the guide means 32 are comprised of at least two bars extended through the lens, which are placed one over the other or in any configuration in order to prevent shaking of the lens according to gravity.

Alternatively, the guide means 32 is comprised of at least one bar of a polygonal cross section as shown in FIG. 6. The polygonal bar prevents the lens 31 from turning around the bar so that the lens 31 maintains its position around the bar. The polygonal bar may have various cross sectional configurations such as triangle, quadrangle, pentagon, hexagon, etc. When the bar has such a polygonal configuration, at least one polygonal bar can prevent shaking of the lens while enabling the lens to be transported.

The driving device 30 according to the second embodiment of the invention is characterized in generating an acceleration force according to the waveform of voltage applied to the driving means 13 so that the driving means can move the lens owing to the acceleration force. The driving means 33 of this embodiment comprises the piezoelectric element, and the voltage waveform applied to the piezoelectric element is shown in FIG. 21.

As shown in a lower part of FIG. 21, the voltage V is elevated at a slow slope in Step b, in which the piezoelectric element is bent by its outer periphery toward the transport direction, restrained by the frictional force between the lens and the guide means. After being elevated up to a peak point, the voltage drops at a sharp slope in Step c so that the piezoelectric element is restored to its original position from the distorted position, in which the piezoelectric element was bent and biassed along the transport direction. Then, the lens advances forward against the frictional force from the guide means.

FIG. 22 illustrates an operation mode reverse to that shown in FIG. 21. In FIG. 22, Step b has a voltage waveform rising at a sharp slope, and when a voltage V as shown in Step b is applied to the driving means of the driving device, the piezoelectric element 33 abruptly applies an acceleration force to the lens 31 so that the lens can advance along the transport direction against the frictional force from the guide means. Then, the voltage waveform declines at a slow slope in Step c, in which the lens remains stationary resulting from the frictional force with the guide means and the bent outer periphery of the piezoelectric element is restored along the transport direction and unfolded to the original flat configuration.

As shown FIGS. 21 and 22, in order to actuate the driving means according to the embodiment of the invention, it is required that voltage V per time or the voltage waveform has different absolute values before and after a peak. In particular, in a region of a sharp slope, the acceleration force resulting from elevation or drop of a voltage phase is required to overcome the interactive force or frictional force between the lens and the guide means.

FIGS. 23 and 24 illustrate alternative operation modes of the driving device according to the second embodiment of the invention. While the operation modes in FIGS. 21 and 22 are referred to as basic modes, those operation modes in FIGS. 23 and 24 can be referred to as speed modes.

In FIG. 23, the driving device accomplishes one operation through three steps. First, in Step b, a voltage V applied to the driving means 33 of the driving device rises at a slow slope. In this case, the lens 31 remains stationary resulting from the frictional force between the lens and the guide means while the distal end of the piezoelectric element or the driving means is expanded along the transport direction of the lens. In Step c, the voltage V applied to the piezoelectric element drops at a sharp slope to have a negative phase. Owing to such variation of the voltage, the piezoelectric element is restored to the original configuration and then contracted for a predetermined thickness from the original one. Because Step c is performed rapidly, an inertia force acts on the weight which is offset forward and thus restrains the same stationary, and the piezoelectric element transports the lens forward about the weight along the guide means. The contracted piezoelectric element is restored to the original flat configuration in Step d, where the voltage V is applied at a slow slope as in the above Step b.

in Step c, absolute values of peaks of the negative and positive voltages are different from each other because the extent of contraction/expansion of the piezoelectric element is not identical. In the contraction/expansion type piezoelectric element in the second embodiment, the extent of contraction is typically smaller than that of expansion. This characteristic of the piezoelectric element varies the absolute values of the peak of the voltages fed to the piezoelectric element.

Unlike the operation mode in FIG. 23, the operation mode in FIG. 24 applies an acceleration force to transport the lens in Steps b and d, and supplies a slow slope of voltage to move the piezoelectric element forward/backward in Step c.

Compared with the operation modes in FIGS. 21 and 22, the operation modes in FIGS. 23 and 24 can be referred to as speed modes since they implement two displacements in one cycle. Therefore, these speed modes can advantageously transport the lens more rapidly than the basic modes in FIGS. 21 and 22.

Likewise in FIGS. 21 and 22, it is required that voltage V per time or the voltage waveform has different absolute values before and after a peak in order to actuate the driving means according to the embodiment of the invention as shown in FIGS. 23 and 24. In particular, in a region of a sharp slope, the acceleration force resulting from elevation or drop of a voltage phase is required to overcome the interactive force or frictional force between the lens and the guide means.

Figure 18:
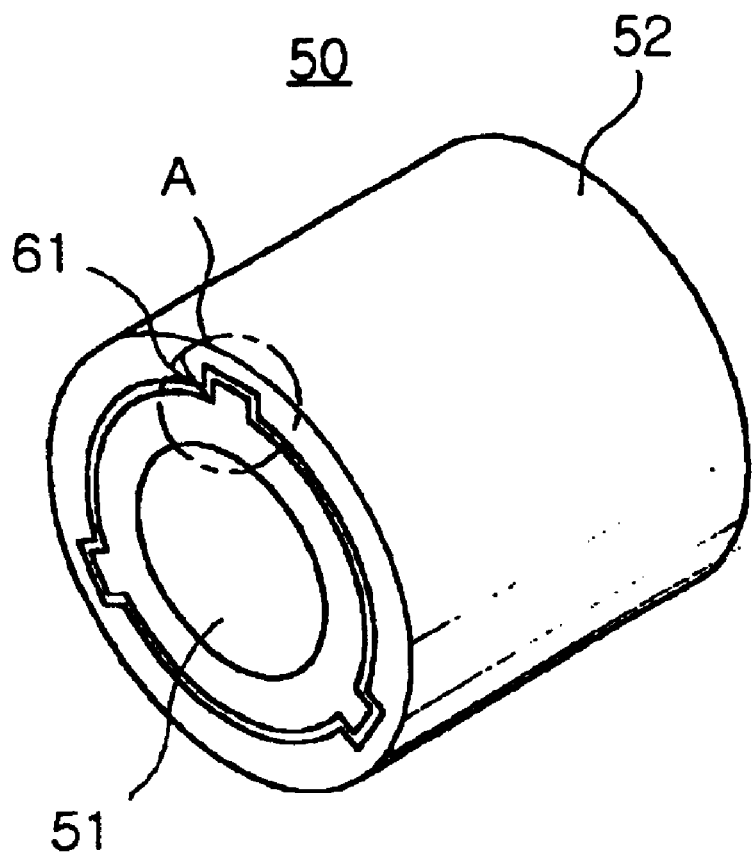
FIG. 18 is an overall perspective view of a driving device according to a third embodiment of the invention.

The driving device of the invention can employ an external frame 52 as guide means as shown in FIG. 18. Following description will disclose a third embodiment which uses the external frame as the guide means.

The driving device of the third embodiment comprises a lens 51 and driving means 53, which is attached to one side of the lens 51 parallel with a transport direction of the lens. The driving means 53 may comprise a piezoelectric element. The third embodiment of the invention is characterized by utilizing the external frame 52 as the guide means, in which the external frame 52 is a lens barrel constituting a lens unit of an optical instrument such as a camera. The external frame 52 contacts the periphery of the lens 52 to guide reciprocating movement or forward/backward movement of the lens. That is, the external frame 52 contacts the periphery of the lens to generate a frictional force therebetween. As a result, the lens cannot move freely within the external frame but be moved under the driving force of the driving means.

Figure 19:
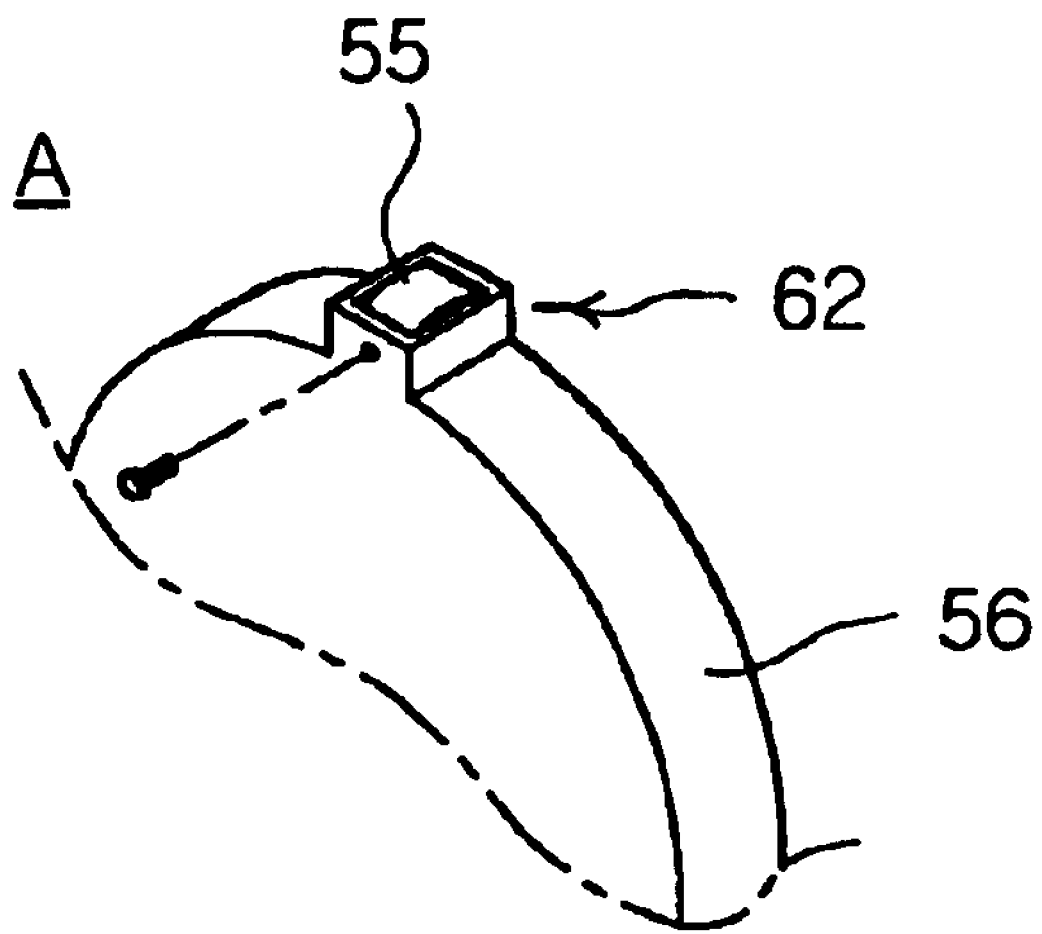
FIG. 19 is a perspective view of elastic means of the driving device shown in FIG. 18.

As shown in FIG. 18, the external frame 52 preferably has recesses 61 of a polygonal configuration. Alternatively, the recesses may be in the form of an arc. The recesses 61 of the external frame 61 are shaped to receive segments 62 which are projected from the lens 51. The projected segments 62 can be formed integral with the lens 51 through shaping such as cutting, trimming and so on of the lens 51. Alternatively, where a lens frame as shown in FIG. 19 is employed as in the first and second embodiments, the segments 62 may also be projected from the lens frame. The recesses 61 of the external frame 52 are elongated along the transport direction of the lens so that the lens can move along the recesses in the external frame.

Application of the external frame of this configuration eliminates the necessity of the guide means such as the guide bar(s) extended through the lens from the lens driving device to further simplify a lens transporting mechanism as well as to omit a process of perforating the lens so that the guide means is/are extended through the lens. Further, the recesses 61 and the projected segments 62 are formed to have polygonal cross sections so that at least one pair of the recess 61 and the segment 62 can maintain the stationary position of the lens without shaking.

In order to enhance the frictional force between the lens and the external frame or maintain efficient contact between the lens and the external frame, elastic means 55 maybe provided to at least one of the projected segments 62 of the lens as shown in FIG. 19. An available example of the elastic means 55 may include a leaf spring which has both ends fixed to the pertinent projected segment 62 and a central portion in contact with the external frame.

In the driving device 50 of the third embodiment, the piezoelectric element has a plurality of piezoelectric element sections which are arranged in a face of the lens in positions adjacent to the lens periphery, spaced at an equal interval as in the driving device of the second embodiment. Alternatively, the piezoelectric element may be shaped as a ring arranged in the face of the lens, surrounding lens portions adjacent to the lens periphery. Further, the piezoelectric element as the driving means may be attached with a weight of a predetermined mass like the above first and second embodiments.

Figure 20:
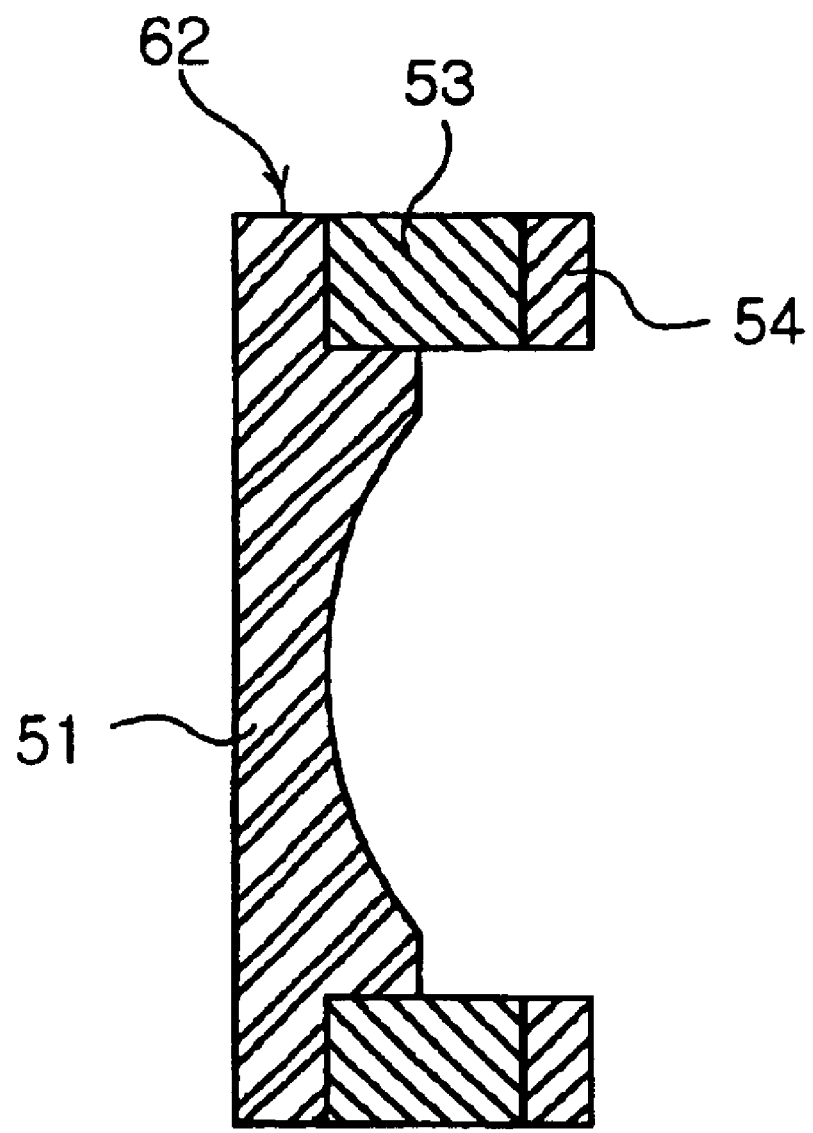
FIG. 20 is a sectional view illustrating coupling between driving means and a lens of the driving device shown in FIG. 18.

FIG. 20 shows a lens 51, a segment 62 projected from the lens 51 and a piezoelectric element 53 in the third embodiment of the invention. In FIG. 20, a rear face of the projected segment 62 in the lens is stepped to have a thickness smaller than the mean thickness of the lens, and the piezoelectric element 53 is attached to a rear face of the projected segment 62. As the rear face of the projected segment is stepped and the piezoelectric element is attached to the stepped rear face of the projected segment, there is an advantage in effect that the lens driving device having the piezoelectric element can be reduced in length along the transport direction. This resultantly allows reduction of the size of the entire optical instrument.

Both of the basic and speed modes in the second embodiment may be also applied to the operation mode of the driving device according to the third embodiment. Further, the waveform of the voltage per time applied to this driving device has different absolute values before and after a peak.

The driving device of the invention can be used for a micro lens module as well as a zoom driving mechanism of a compact film zoom camera, a digital zoom camera, various observation cameras and a camcorder. Further, the driving device is not under the influence of a magnetic field since it adopts piezoelectric element-based actuation. As a result, the driving device of the invention can be applied for probing a place which rarely allows magnetic access (e.g., MRI photographing) and to a zoom mechanism of an observation camera. Further, the driving device of the invention can lengthen the transport distance beyond that of the conventional lens driving structure to realize a zoom lens mechanism of a high magnification ratio in which large variation of a focus length is required. Based upon these characteristics, the driving device of the invention can replace a conventional electromagnetic motor.

According to the present invention as set forth above, an object of the present invention to provide a driving device which can integrate the lens is integrated with the driving means to simplify the structure of a lens driving unit thereby reducing the size of a zoom lens unit.

Further, according to the present invention, the driving means can directly linearly drive the lens to obtain high driving efficiency as well as directly control the position of the lens while the transport distance of the lens can be controlled without restriction by other components.

The present invention also allows the lens to be maintained in position without additional supply of energy, while realizing the driving device which can execute precise focus control and precise magnification adjustment through ultra precise control of lens position in order to realize high resolution.

Moreover, the driving method of the present invention using the above driving device allows a number of transport modes to be selected.

While the present invention has been shown and described in connection with the preferred embodiment, it is to be understood that those skilled in the art can make various modifications and variations to the present invention without departing from the spirit and scope of the appended claims.

What is claimed is:

1. A driving device for transporting a lens of an optical instrument said device comprising:
    a guide element connected perpendicularly with the lens for guiding reciprocating movement of the lens;
    a driving element arranged coplanar with the lens and fixed, by a first end, to a periphery of the lens for providing the lens with a transport force which is larger than an interactive force between the lens and the guide element, wherein the driving element comprises a piezoelectric element powered by a supply voltage; and
    a weight of a predetermined mass attached to a second end of the piezoelectric element opposite to the first end.

2. The driving device as set forth in claim 1, wherein the piezoelectric element comprises a plurality of element sections which are arranged in the periphery of the lens, spaced at an equal interval.

3. The driving device as set forth in claim 1, wherein the piezoelectric element is shaped as a ring surrounding the entire periphery of the lens.

4. A driving device for transporting a lens of an optical instrument, said device comprising:
    a guide element connected perpendicularly with the lens for guiding reciprocating movement of the lens; and
    a driving element arranged coplanar with the lens and fixed, by a first end, to a periphery of the lens for providing the lens with a transport force which is larger than an interactive force between the lens and the guide element;
    wherein the guide element is extended through the lens in a position adjacent to the periphery of the lens.

5. The driving device as set forth in claim 4, wherein the guide element comprises at least one bar of a polygonal cross section.

6. The driving device as set forth in claim 4, wherein the guide element comprises at least two bars of a circular cross section.

7. A driving device for transporting a lens of an optical instrument, said device comprising:
    a guide element connected perpendicularly with the lens for guiding reciprocating movement of the lens;
    a driving element arranged coplanar with the lens and fixed, by a first end, to a periphery of the lens for providing the lens with a transport force which is larger than an interactive force between the lens and the guide element; and an elastic element for enabling elastic contact between the lens and the guide element to provide the lens and the guide element with an interactive force proportional to an elastic force.

8. A driving device for transporting a lens of an optical instrument, said device comprising:
a guide element connected perpendicularly with the lens for guiding reciprocating movement of the lens; and
a driving element arranged coplanar with the lens and fixed, by a first end, to a periphery of the lens for providing the lens with a transport force which is larger than an interactive force between the lens and the guide element;
wherein
the driving element comprises a piezoelectric element powered by a supply voltage; and
absolute values of the supply voltage per time fed to the piezoelectric element are different from each other before and after a peak.

9. A driving device for transporting a lens in an optical instrument, said device comprising:
a guide element connected perpendicularly with the lens for guiding reciprocating movement of the lens;
a driving element having a first end fixed perpendicularly to a face of the lens to provide the lens with a transport force which is larger than an interactive force between the lens and the guide element, wherein the driving element comprises a piezoelectric element powered by a supply voltage; and
a weight of a predetermined mass attached to a second end of the piezoelectric element opposite to the first end.

10. The driving device as set forth in claim 9, wherein the piezoelectric element comprises a plurality of element sections arranged in the face of the lens adjacent to a periphery of the lens, spaced at an equal interval.

11. The driving device as set forth in claim 9, wherein the piezoelectric element is shaped as a ring arranged in the face of the lens adjacent to a periphery thereof.

12. A driving device for transporting a lens in an optical instrument, said device comprising:
a guide element connected perpendicularly with the lens for guiding reciprocating movement of the lens;
a driving element having a first end fixed perpendicularly to a face of the lens to provide the lens with a transport force which is larger than an interactive force between the lens and the guide element; and
an elastic element for enabling elastic contact between the lens and the guide element to provide the lens and the guide element with an interactive force proportional to an elastic force.

13. A driving device for transporting a lens in an optical instrument, said device comprising:
a guide element connected perpendicularly with the lens for guiding reciprocating movement of the lens; and
a driving element having a first end fixed perpendicularly to a face of the lens to provide the lens with a transport force which is larger than an interactive force between the lens and the guide element;
wherein the guide element is extended through the lens in a position adjacent to a periphery of the lens.

14. The driving device as set forth in claim 13, wherein the guide element comprises at least one bar of a polygonal cross section.

15. The driving device as set forth in claim 13, wherein the guide element comprises at least two bars of a circular cross section.

16. A driving device for transporting a lens in an optical instrument, said device comprising:
a guide element connected perpendicularly with the lens for guiding reciprocating movement of the lens; and
a driving element having a first end fixed perpendicularly to a face of the lens to provide the lens with a transport force which is larger than an interactive force between the lens and the guide element;
wherein
the guide element comprises an external frame contacting with a periphery of the lens to guide reciprocating movement of the lens; and
the lens has at least one segment projected radially from the periphery of the lens, and the external frame has a recess formed along a route of the lens for receiving the projected segment.

17. The driving device as set forth in claim 16, wherein a piezoelectric element is fixed with a portion of the projected segment.

18. A driving device for transporting a lens in an optical instrument, said device comprising:
a guide element connected perpendicularly with the lens for guiding reciprocating movement of the lens; and
a driving element having a first end fixed perpendicularly to a face of the lens to provide the lens with a transport force which is larger than an interactive force between the lens and the guide element;
wherein
the driving element comprises a piezoelectric element powered by a supply voltage; and
absolute values of the supply voltage per time fed to the piezoelectric element are different from each other before and after a peak.

19. A method of transporting a lens using a driving device comprising a guide element connected perpendicularly with the lens for guiding reciprocating movement of the lens, and a driving element arranged coplanar with the lens and fixed, by a first end, to a periphery of the lens for providing the lens with a transport force which is larger than an interactive force between the lens and the guide element, the method comprising the steps of:
(a) moving a second end of the driving element along a transport direction of the lens at a first velocity; and
(b) restoring the driving element to an original configuration thereof at a second velocity faster than the first velocity to thereby move the lens which is fixed with the first end of the driving element.

20. The method as set forth in claim 19, wherein the driving element comprises a piezoelectric element powered by a supply voltage, and wherein the supply voltage per time fed to the piezoelectric element in the step (a) has an absolute value smaller than that of the supply voltage in the step (b).

21. A method of transporting a lens using a driving device comprising a guide element connected perpendicularly with the lens for guiding reciprocating movement of the lens, and a driving element arranged coplanar with the lens and fixed, by a first end, to a periphery of the lens providing the lens with a transport force which is larger than an interactive force between the lens and the guide element, the method comprising the steps of:
(a) moving a second end of the driving element along a transport direction of the lens at a first velocity; and
(b) operating the driving element at a second velocity faster than the first velocity to move the lens, which is fixed to the first end of the driving element, along the transport direction of the lens beyond a position of the lens that will be achieved by restoration of the driving element to an original configuration thereof; and (c) restoring the second end of the driving element to said original configuration.

22. The method as set forth in claim 21, wherein the driving element comprises a piezoelectric element powered by a supply voltage, and wherein the supply voltage per time fed to the piezoelectric element in the step (a) has an absolute value smaller than that of the supply voltage in the step (b).

23. A driving device for transporting a lens of an optical instrument, comprising:
   guide means connected perpendicularly with the lens for guiding reciprocating movement of the lens;
   elastic means the enabling elastic contact between the lens and the guide means to provide the lens and the guide means with an interactive force proportional to an elastic force;
   piezoelectric driving means being coplanar with the lens, having a first end fixed to a periphery of the lens, and powered by a supply voltage to provide the lens with a transport force which is larger than an interactive force between the lens and the guide means;
   a weight of a predetermined mass attached to a second end of the piezoelectric driving means opposite to the first end.

24. The driving device as set forth in claim 23, wherein the piezoelectric driving means comprises a plurality of sections which are arranged in the periphery of the lens, spaced at an equal interval.

25. The driving device as set forth in claim 23, wherein the piezoelectric driving means is shaped as a ring surrounding an entire periphery of the lens.

26. The driving device as set forth in claim 23, further comprising a lens frame for surrounding the periphery of the lens, wherein the first end of the piezoelectric driving means is fixed to the lens flame.

27. The driving device as set forth in claim 23, wherein the guide means is extended through the lens in a position adjacent to the periphery of the lens.

28. The driving device as set forth in claim 27, wherein the guide means comprises at least one bar of a polygonal cross section.

29. The driving device as set forth in claim 27, wherein the guide means comprises at least two bars of a circular cross section.

30. The driving device as set forth in claim 23, wherein absolute values of the supply voltage per time fed to the piezoelectric element are different from each other before and after a peak.

31. A driving device for transporting a lens of an optical instrument, comprising:
   guide means extended through the lens in a position adjacent to the periphery of the lens for guiding reciprocating movement of the lens;
   elastic means for enabling elastic contact between the lens and the guide means to provide the lens and the guide means with an interactive force proportional to an elastic force;
   piezoelectric driving means having a first end fixed perpendicularly to a face of the lens, and powered by a supply voltage to provide the lens with a transport force which is larger than an interactive force between the lens and the guide means; and
   a weight of a predetermined mass attached to a second end of the piezoelectric driving means opposite to the first end.

32. The driving device as set forth in claim 31, wherein the piezoelectric element comprises a plurality of element sections arranged in the face of the lens adjacent to a periphery of the lens, spaced at an equal interval.

33. The driving device as set forth in claim 31, wherein the piezoelectric element is shaped as a ring arranged in the face of the lens adjacent to the periphery thereof.

34. The driving device as set forth in claim 31, further comprising a lens frame for surrounding the periphery of the lens, wherein the first end of the piezoelectric element is fixed to the lens frame.

35. The driving device as set forth in claim 31, wherein the guide means comprises at least one bar of a polygonal cross section.

36. The driving device as set forth in claim 31, wherein the guide means comprises at least two bars of a circular cross section.

37. The driving device as set forth in claim 31, wherein absolute values of the supply voltage per time fed to the piezoelectric element are different from each other before and after a peak.

38. A driving device for transporting a lens of an optical instrument, comprising:
   an external frame being in contact with a peripheral surface of the lens for guiding reciprocating movement of the lens;
   elastic means for enabling elastic contact between the lens and the external flame to provide the lens and the external frame with an interactive force proportional to an elastic force;
   piezoelectric driving means having a first end fixed perpendicularly to a face of the lens, and powered by a supply voltage to provide the lens with a transport force which is larger than an interactive force between the lens and the guide means; and
   a weight of a predetermined mass attached to a second end of the piezoelectric driving means opposite to the first end.

39. The driving device as set forth in claim 38, wherein the piezoelectric element comprises a plurality of element sections arranged in the face of the lens adjacent to a periphery of the lens, spaced at an equal interval.

40. The driving device as set forth in claim 38, wherein the piezoelectric element is shaped as a ring arranged in the face of the lens adjacent to the periphery thereof.

41. The driving device as set forth in claim 38, further comprising a lens frame for surrounding the periphery of the lens, wherein the first end of the piezoelectric element is fixed to the lens frame.

42. The driving device as set forth in claim 38, wherein the lens has at learnt one segment projected radially from the periphery of the lens, and wherein the external frame has a recess formed along a route of the lens for receiving the projected segment.

43. The driving device as set forth in claim 42, wherein the piezoelectric element is fixed with a portion of the projected segment.

44. The driving device as set forth in claim 38, absolute values of the supply voltage per time fed to the piezoelectric element are different from each other before and after a peak.

45. A method of transporting a lens using a driving device comprising a guide element connected perpendicularly with the lens for guiding reciprocating movement of the lens, and a driving element having a first end fixed perpendicularly to a face of the lens to provide the lens with a transport force which is larger than an interactive force between the lens and the guide element, the method comprising the steps of:

(a) moving a second end of the driving element along a transport direction of the lens at a first velocity; and (b) restoring the driving element to an original configuration thereof at a second velocity faster than the first velocity to move the lens which is fixed with the first end of the driving element.

46. The method as set forth in claim 45, wherein the driving element comprises a piezoelectric element powered by a supply voltage, and wherein the supply voltage per time fed to the piezoelectric element in the step (a) has an absolute value smaller than that of the supply voltage in the step (b).

47. A method of transporting a lens using a driving device comprising a guide element connected perpendicularly with the lens for guiding reciprocating movement of the lens, and a driving element having a first end fixed perpendicularly to a face of the lens to provide the lens with a transport force which is larger than an interactive force between the lens and the guide element, the method comprising the steps of:

(a) moving a second end of the driving element along a transport direction of the lens at a first velocity; and (b) operating the driving element at a second velocity faster than the first velocity to move the lens, which is fixed to the first end of the driving element, along the transport direction of the lens beyond a position of the lens that will be achieved by restoration of the driving element to an original configuration thereon; and (c) restoring the second end of the driving element to said original configuration.

48. The method as set forth in claim 47, wherein the driving element comprises a piezoelectric element powered by a supply voltage, and wherein the supply voltage per time fed to the piezoelectric element in the step (a) has an absolute value smaller than that of the supply voltage in the step (b).

* * * * *